US008655718B2

(12) United States Patent
Athsani et al.

(10) Patent No.: US 8,655,718 B2
(45) Date of Patent: Feb. 18, 2014

(54) METHODS FOR AUGMENTING USER-GENERATED CONTENT USING A MONETIZABLE FEATURE

(75) Inventors: Athellina Athsani, San Jose, CA (US); Chris Higgins, Portland, OR (US); Joseph O'Sullivan, Oakland, CA (US); Marc Davis, San Francisco, CA (US); Ron Martinez, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 567 days.

(21) Appl. No.: 11/959,217

(22) Filed: Dec. 18, 2007

(65) Prior Publication Data
US 2009/0157450 A1 Jun. 18, 2009

(51) Int. Cl.
*G06Q 40/00* (2012.01)
(52) U.S. Cl.
USPC ............... 705/14; 705/26; 709/217; 725/60
(58) Field of Classification Search
USPC ............... 705/14, 80, 26; 709/217; 725/60
See application file for complete search history.

(56) References Cited

U.S. PATENT DOCUMENTS

| 6,490,601 | B1 * | 12/2002 | Markus et al. ............... 715/207 |
| 6,519,571 | B1 | 2/2003 | Guheen |
| 7,543,005 | B1 | 6/2009 | Edelman |
| 7,706,740 | B2 | 4/2010 | Collins |
| 7,975,020 | B1 * | 7/2011 | Green et al. ............... 709/217 |
| 2001/0020236 | A1 | 9/2001 | Cannon |
| 2002/0120498 | A1 | 8/2002 | Gordon et al. |
| 2002/0120935 | A1 * | 8/2002 | Huber et al. ............... 725/60 |
| 2004/0083133 | A1 | 4/2004 | Nicholas et al. |
| 2005/0096980 | A1 | 5/2005 | Koningstein |
| 2005/0144063 | A1 | 6/2005 | Spector |
| 2006/0069612 | A1 | 3/2006 | Hurt et al. |
| 2006/0122884 | A1 | 6/2006 | Graham et al. |

(Continued)

FOREIGN PATENT DOCUMENTS

| KR | 10-2001-0081736 A | 8/2001 |
| KR | 10-2002-0010853 A | 2/2002 |

(Continued)

OTHER PUBLICATIONS

Microsoft Computer Dictionary, 2002, Microsoft Press, Fitht Edition, p. 383.*

(Continued)

*Primary Examiner* — Charles Kyle
*Assistant Examiner* — Siegfried E Chencinski
(74) *Attorney, Agent, or Firm* — James J. DeCarlo; Greenberg Traurig, LLP

(57) ABSTRACT

A system for monetization of content includes a storage device for storage and retrieval of data, and a library of content and advertisements stored within the storage device. The library comprises an organizational structure for facilitating the storage and retrieval. The system also includes a monetization engine for identifying within the library a first content item having a first monetizable feature. The system is configured for selecting a second content item from several content items within the library, and associating the second content item to the first content item by using the first monetizable feature for presentation of the second content item in conjunction with the first content item. Further embodiments include various additional systems, methods, and computer readable media for implementation of the foregoing.

19 Claims, 21 Drawing Sheets

(56) References Cited

U.S. PATENT DOCUMENTS

| | | | |
|---|---|---|---|
| 2006/0168616 | A1 | 7/2006 | Candelore et al. |
| 2006/0248209 | A1 | 11/2006 | Chiu |
| 2007/0055986 | A1 | 3/2007 | Gilley et al. |
| 2007/0072676 | A1 | 3/2007 | Baluja |
| 2007/0150353 | A1* | 6/2007 | Krassner et al. ............... 705/14 |
| 2007/0192794 | A1 | 8/2007 | Curtis et al. |
| 2008/0065502 | A1* | 3/2008 | Diaz Perez .................... 705/26 |
| 2008/0066107 | A1 | 3/2008 | Moonka |
| 2008/0214153 | A1 | 9/2008 | Ramer et al. |
| 2008/0214157 | A1 | 9/2008 | Ramer et al. |
| 2009/0106100 | A1* | 4/2009 | Mashinsky .................... 705/14 |
| 2009/0132365 | A1 | 5/2009 | Gruenhagen et al. |

FOREIGN PATENT DOCUMENTS

| | | |
|---|---|---|
| KR | 2006-0088438 A | 8/2006 |
| KR | 2006-0114245 A | 11/2006 |
| KR | 10-0763724 B1 | 10/2007 |

OTHER PUBLICATIONS

Written Opinion of the International Searching Authority for Related Foreign Application PCT/US2008/084583.
International Search Report for Related Foreign Application PCT/US2008/084583.
Written Opinion of the International Searching Authority for Related Foreign Application PCT/US2008/084726.
International Search Report for Related Foreign Application PCT/US2008/084726.
U.S. Appl. No. 11/963,349, filed Dec. 21, 2007, O'Sullivan.
U.S. Appl. No. 11/953,715, filed Dec. 10, 2007, Athsani.
Office Action issued by the USPTO for U.S. Appl. No. 11/963,349 dated Nov. 18, 2010.
Office Action issued by the USPTO for U.S. Appl. No. 11/953,715 dated Jul. 18, 2011.
Office Action issued by the USPTO for U.S. Appl. No. 11/953,715 dated Jun. 1, 2012.
Office Action issued by the USPTO for U.S. Appl. No. 11/953,715 on Sep. 7, 2012.

* cited by examiner

| TYPE | MEDIA TYPE | DESCRIPTION | COMMENTS |
|---|---|---|---|
| Spatial | Numeric | GPS Coordinates | |
| Spatial | Numeric | Cell ID | |
| Spatial | Numeric | Cell LAC | |
| Spatial | Numeric | Cell MNC | |
| Spatial | Numeric | Cell MCC | |
| Spatial | Numeric | CellTower Signal Strength | |
| Spatial | Numeric | Upcoming Venue ID | |
| Spatial | Numeric | WoeID | |
| Spatial | Numeric | Yahoo! Local ID | |
| Spatial | Numeric | DMA | |
| Spatial | Textual | Place Name | |
| Spatial | Textual | User-Generated Place Name | |
| Spatial | Textual | Street Address | |
| Spatial | Textual | City | |
| Spatial | Textual | State | |
| Spatial | Textual | Country | |
| Spatial | Textual | Neighborhood | |
| Spatial | Textual | County | |
| Spatial | Textual | Region | |
| Temporal | Numeric | Time Point | |
| Temporal | Numeric | Temporal Duration | |
| Temporal | Textual | Days of Week | |
| Temporal | Textual | Weekday/Weekend | |
| Temporal | Textual | Months | |
| Temporal | Textual | Seasons | |
| Temporal | Textual | Holidays | |
| Temporal | Textual | Event Name | |
| Temporal | Textual | User-Generated Event/Time Name | |
| Temporal | Textual | Upcoming Event ID | |
| Social | Numeric | IEMI Number | |
| Social | Numeric | Cell Phone Number | |
| Social | Numeric | Other Phone Numbers | |
| Social | Numeric | Birthdate | |
| Social | Numeric | Yahoo! GUID | |
| Social | Numeric | Social Security Number | |
| Social | Numeric | Credit Card Number | |
| Social | Numeric | Driver's License Number | |
| Social | Numeric | Bluetooth MAC Address | |
| Social | Numeric | Personal Computer IP Address | |
| Social | Numeric | Degree of Connection to Person | |
| Social | Textual | Login | |
| Social | Textual | Handle | |
| Social | Textual | Full Name | |
| Social | Textual | Nickname | |
| Social | Textual | Type of Connection to Person | |
| Consumption | Textual | Click | |
| Consumption | Textual | Favorite | |
| Consumption | Textual | Rate | |
| Consumption | Textual | Comment | |
| Consumption | Textual | Note | |
| Consumption | Textual | Tag | |
| Consumption | Textual | Review | |
| Consumption | Textual | Save | |
| Consumption | Textual | Share | |

*Figure 21*

METHODS FOR AUGMENTING USER-GENERATED CONTENT USING A MONETIZABLE FEATURE

FIELD OF THE INVENTION

The present invention is related to the field of advertising and is more specifically directed to advertising package.

BACKGROUND

The Internet provides a mechanism for merchants to offer a vast amount of products and services to consumers. Internet portals provide users an entrance and guide into the vast resources of the Internet. Typically, an Internet portal provides a range of search, email, news, shopping, chat, maps, finance, entertainment, and other Internet services and content. Yahoo, the assignee of the present invention, is an example of such an Internet portal.

When a user visits certain locations on the Internet (e.g., web sites), including an Internet portal, a system can capture the user's online activity. This information may be recorded and analyzed to determine patterns and interests of the user. In turn, these patterns and interests may be used to target the user to provide a more meaningful and rich experience. For example, if interests in certain products and services of the user are determined, content and advertisements, pertaining to those products and services, may be served to the user. Advertisements are usually provided by advertisers or marketers, who research and develop campaigns for the market. Content is typically provided by a network of publishers, often in conjunction with a portal provider. Recently much content on the Internet is generated, posted, edited and/or re-edited by users, for presentation to an audience of users.

Currently, advertising through computer networks such as the Internet is widely used along with advertising through other mediums, such as television, radio, or print. In particular, online advertising through the Internet provides a mechanism for merchants to offer advertisements for a vast amount of products and services to online users. In terms of marketing strategy, different online advertisements have different objectives depending on the user toward whom an advertisement is targeted, and the context of the advertisement.

Often, an advertiser will carry out an advertising campaign where a series of one or more advertisements are continually distributed over the Internet over a predetermined period of time. Advertisements in an advertising campaign are typically branding advertisements but may also include direct response or purchasing advertisements. A system that serves well targeted advertisements benefits both the advertiser/marketer, who provides a message to a target audience, and a user who receives advertisements in areas of interest to the user. Similarly, publishers and portals are benefited by increased relevance and/or traffic.

SUMMARY

A method of ad insertion submits content into a system. Generally, the content is submitted by an owner, creator, or producer of content. The content is usually augmented with metadata, tags, or other data that provide additional information regarding the content and associated users. The method determines a set of relevant advertisements and selects a first advertisement from the set of relevant advertisements. For instance, the first advertisement includes either an implicit advertisement or an explicit advertisement, and the set of relevant advertisements preferably includes several advertisements from differing sources. The method selects a set of options for display of the selected first advertisement in conjunction with the content and tracks the interaction of users with the composite content-advertisement as displayed.

The metadata includes one or more of tags, labeling, and categorization. The method optionally performs the ad insertion while the content is being edited such as by using a conventional media editing application. The set of relevant advertisements includes relevant advertising methods, ad clips, and/or ad types based on contextual information for the user, the metadata, and/or the audience. The options for ad display include insertion of an advertisement by using one or more of pre-roll, mid-roll and post-roll insertion. In one implementation, the method inserts the first advertisement based on an invisible marker set by one of the user, the system, and an advertiser within the system. The invisible marker is for including additional material with the content that is separate from the content.

For certain types of content such as image and video content, the method inserts the first advertisement by using surface areas within the uploaded content. The surface area is usually identified by a user or by an automated system. For instance, some embodiments use image recognition to identify relevant objects, locations, or surface areas for the placement of advertising on the user generated content. Selecting the first advertisement for insertion may further include in some cases recommendation by the system, selection by the system, selection by the producer, generation by the producer, selection by another user, and/or selection by an advertiser. Further, selecting the advertisement may be based on the metadata provided by the content producer and by contextual information surrounding the content, or audience.

A particular implementation provides the user a selection of monetization options that include advertisement revenue sharing, cost per click (CPC), cost per impression (CPM), cost per action (CPA), and/or brand points. Some implementations submit the content with information regarding at least the selected first advertisement to a location for the presentation of the content in conjunction with the selected first advertisement. The information is for describing the presentation of the first advertisement as either embedded within the content such as, for example, appearing part of the content, or alternatively as appearing in conjunction with the content, but separate from the content. In either of these cases, the first advertisement may be stored separately from the content or may be stored with the content. Once selected, however, the first advertisement is preferably presented in conjunction with the content (e.g., simultaneously, within, during, pre-roll, mid-roll, post-roll, interstitially, or by another means).

In a particular embodiment, a method for placing advertisements selects a first content from a variety of content, analyzes the first content for the presence of advertiser references, and matches a first advertisement from an advertiser to the first content by using the advertiser references. This method determines a set of presentation preferences for presentation of the first advertisement in conjunction with the first content and includes the set of presentation preferences with the first content. In some cases, the method embeds the presentation preferences as advertising information into the first content. Advantageously, the method presents the first advertisement in conjunction with the first content by using the presentation preferences. Further, the method tracks the presentation of content for monetization events and stores the tracking information in a log. The monetization event includes, for example, an impression, a click, an acquisition, and/or a conversion.

The advertiser references may include markers within the content, and some implementations place these markers for advertising information within the first content. In these cases, the advertisements of the advertiser are matched with the selected first content by using one or more of the markers. The method forms a sponsorship agreement between the advertiser and a provider of the first content for providing monetization of the first content such as, for example, revenue sharing between the advertiser and the provider of the first content. When the provider of the content generates the content, the content comprises user generated content. In an embodiment, the advertiser selects the content, and a system is provided to the advertiser. The system includes the variety of content and the first content, such that when the advertiser logs into the system, the advertiser receives the variety of content for selecting the first content. In some embodiments, the content is selected for the advertiser based on the advertiser's profile, or the content is recommended based on the advertiser's past actions and/or a set of preferences selected by the advertiser. Some embodiments search among registered content based on the content genre, and select a variety of content to sponsor, or on which to place advertisements. Some of these embodiments allow for requesting a specific type of content or subject matter, and further include a setting to specify a time frame or deadline for the end of submission from content producers. The content, request for content, and/or sponsorships may involve a specific type of content producer based on one or more of the content producer's artistic bend, popularity, celebrity status, and/or status as a subject matter expert. In one embodiment, an ad presentation preference is selected based on either individual content or by using a group preference. The ad presentation preference is also set based on one or more of contextual information for the user, the content metadata, and the audience. For instance, the ad presentation preference may include at least one of a relevant advertisement method, a set of ad clips, and ad type. The first advertisement may include a static advertisement that is predetermined for the first content, a dynamic advertisement that changes with each presentation of the first content, and/or an implicit advertisement that is presented in conjunction with the first content such that the implicit advertisement appears to be part of the presentation of the content.

A system for monetization of content includes a storage device for storage and retrieval of data, and a library of content and advertisements stored within the storage device. The library comprises an organizational structure for facilitating the storage and retrieval. The system also includes a monetization engine for identifying within the library a first content item having a first monetizable feature. The system is configured for selecting a second content item from several content items within the library, and associating the second content item to the first content item by using the first monetizable feature for presentation of the second content item in conjunction with the first content item.

Some embodiments are further configured for presenting the second content item in conjunction with the first content item, and tracking user interactions for the presentation of the second content item. Some systems are further configured for receiving at least one of the first and second content items, thereby generating a received content item, and storing the received content item within the organizational structure of the library. Preferably, the monetization engine is configured for calculating a revenue sharing value for the first monetizable feature of the first content item, and/or for presenting the revenue sharing value to a user of the system.

When the second content item has a cost associated with presentation of the second content item, the system is further configured for determining the cost of using the second content item, selectively presenting the cost to a user of the system, charging the user for the use of the second content item, and/or distributing the revenue from the use to an owner of the second content item. In some cases, the first content item comprises user generated content, and/or the second content item is an advertisement comprising one or more of a static ad, a dynamic ad, an implicit ad, and an explicit ad. The first content item may include image and/or video data. In these cases, the first monetizable feature may include a surface within the first content item for the placement of an advertisement. The first monetizable feature may further include a marker within the first content item for the association of the second content item to the first content item. Preferably, the system is configured for identifying insertion points for the marker, and placing the marker with one or more insertion points, which is optionally by user request or by system automation. For instance, the system is advantageously configured for setting several insertion points, including dynamic run-time markers for on-the-fly ad insertion at a time of presentation of content.

Some implementations include an interface for interacting with the library. Such interactions include, for example, operations to edit, search, sort, and combine content and advertisements stored within the library with selected content and advertisements. In one implementation, the interface includes a graphical user interface having drag and drop functionality for the placement of one or more of the second content item, a marker, and an insertion point, in relation to the first content item. A user of the system for the monetization of content includes one or more of an advertiser, an operator, a publisher, an owner of content, a producer, a consumer of content, and a user who shares, distributes, or uploads content. An implementation of the system further includes one or more features of a self serve application and an automated system for selecting and associating the second content item with the first content item, for users of the system.

The system of some embodiments is further configured for receiving one or more of an advertising campaign for an advertiser, an advertiser payment offer, and associated ad copy for the presentation of the advertiser's content including advertisements in conjunction with specific content. Some systems selective billing and pay users for qualifying interactions with composites that comprise presentations of the second content item in conjunction with the first content item. In one case, the second content item includes an advertisement and the system associates the advertisement to the first content item by embedding the advertisement within the first content. Some implementations are configured for modifying ad copy or financial terms of use of content and advertising such that higher rated content receives higher valuation. Some systems allow advertisers to post requests to other users of the system for user generated content (UGC) and for users of the system to search and select data from among the advertisers. Some implementations perform automated ad insertion into content based upon collaborative filtering of related past performances for best-match insertion, while some implementations perform dynamic ad insertion based upon user or advertiser generated variables resolved at display request time. Some systems include a device for remote presentation of monetization options to a user of the system.

A method of monetization of content stores a first content item within a library of content and advertisements. The library comprises an organizational structure for facilitating the storage. The method determines a first monetizable feature for the first content item within the library, selects a second content item from a plurality of content items within the library, and associates the second content item to the first content item by using the first monetizable feature for presentation of the second content item in conjunction with the first content item. Preferably, the method presents the second item in conjunction with the first item, and tracks user interactions for the presentation of the second content item. The method of some embodiments receives at least one of the first and second content items, thereby generating a received content item, and stores the received content item within the organizational structure of the library. The method calculates a revenue sharing value for the first monetizable feature of the first content item, and presents the revenue sharing value to a user of the system.

A computer readable medium stores a program for monetization of content. The computer readable medium has sets of instructions. The instructions store a first content item within a library of content and advertisements. The library comprises an organizational structure for facilitating the storage. The instructions determine a first monetizable feature for the first content item within the library, select the second content item from a plurality of content items within the library, and associate a second content item to the first content item by using the first monetizable feature for presentation of the second content item in conjunction with the first content item.

A device for presenting monetization of content to a user has a capture mechanism for capture of the content, a monetization module, a display, and a storage medium. The content includes one or more monetizable features. The monetization module is for determining a first monetizable feature of the content, and for calculating a first value for the first monetizable feature. The display is for presenting the monetization of the content to the user of the device. The storage medium is for storing the captured content and optionally storing associated monetization information of the captured content. Some of these devices further comprise a networking interface for coupling the device to a networked system. The networked system has an engine for monetization of content that is in communication with the monetization module. Some of the devices optionally store the captured content within a library of content and advertisements, thereby generating a first stored content item. The library preferably has an organizational structure for facilitating the storage. The monetizable feature is often a surface of an object within the content and/or a marker, and is for the selective placement and presentation of additional content including advertising in conjunction with the content.

An advertiser provides one or more of an enabled device to a producer of content for generation of content and monetization of the content and/or an online system or website for the submission of pre-generated content where the majority of editing and/or monetization occurs within the online system, and submitted content is reviewed and modified manually and/or by system automation.

A system for tracking user interactions includes a monetization module for associating a first content to a second content. The association is based on the monetization of the first content by using the second content. More specifically, the system is configured for determining a first monetizable feature for the first content, selecting a second content from a plurality of content, and associating the second content to the first content by using the first monetizable feature for presentation of the second content in conjunction with the first content. The system also includes a storage device for storing the association between the first and second content, a location for presenting the first content in conjunction with the second content for consumption by a group of consumer type users, and a tracking module for tracking user interactions for the presentation of the second content. The tracking module may also be used for calculating a revenue sharing value for the first monetizable feature of the first content. The revenue sharing value is optionally presented to a user of the system. During presentation to consumer type users, the system is configured to monitor the actions of a first consumer of the second content in relation to the second content. The action comprises one or more of clicking to a website, viewing a location on a map, calling a phone number to speak to a marketer, receiving an electronic or physical coupon, and interacting with the content as a result of the content. Preferably, the monetization of the first content by using the second content comprises one or more of a cost per impression (CPI), cost per click (CPC), cost per lead (CPL), and a cost per action (CPA).

Further embodiments include various additional systems, methods, and computer readable media for implementation of the foregoing.

BRIEF DESCRIPTION OF THE DRAWINGS

The novel features of the invention are set forth in the appended claims. However, for purpose of explanation, several embodiments of the invention are set forth in the following figures.

FIG. 21 illustrates several examples of meta data used by some embodiments of the invention.

DETAILED DESCRIPTION

Figure 1:
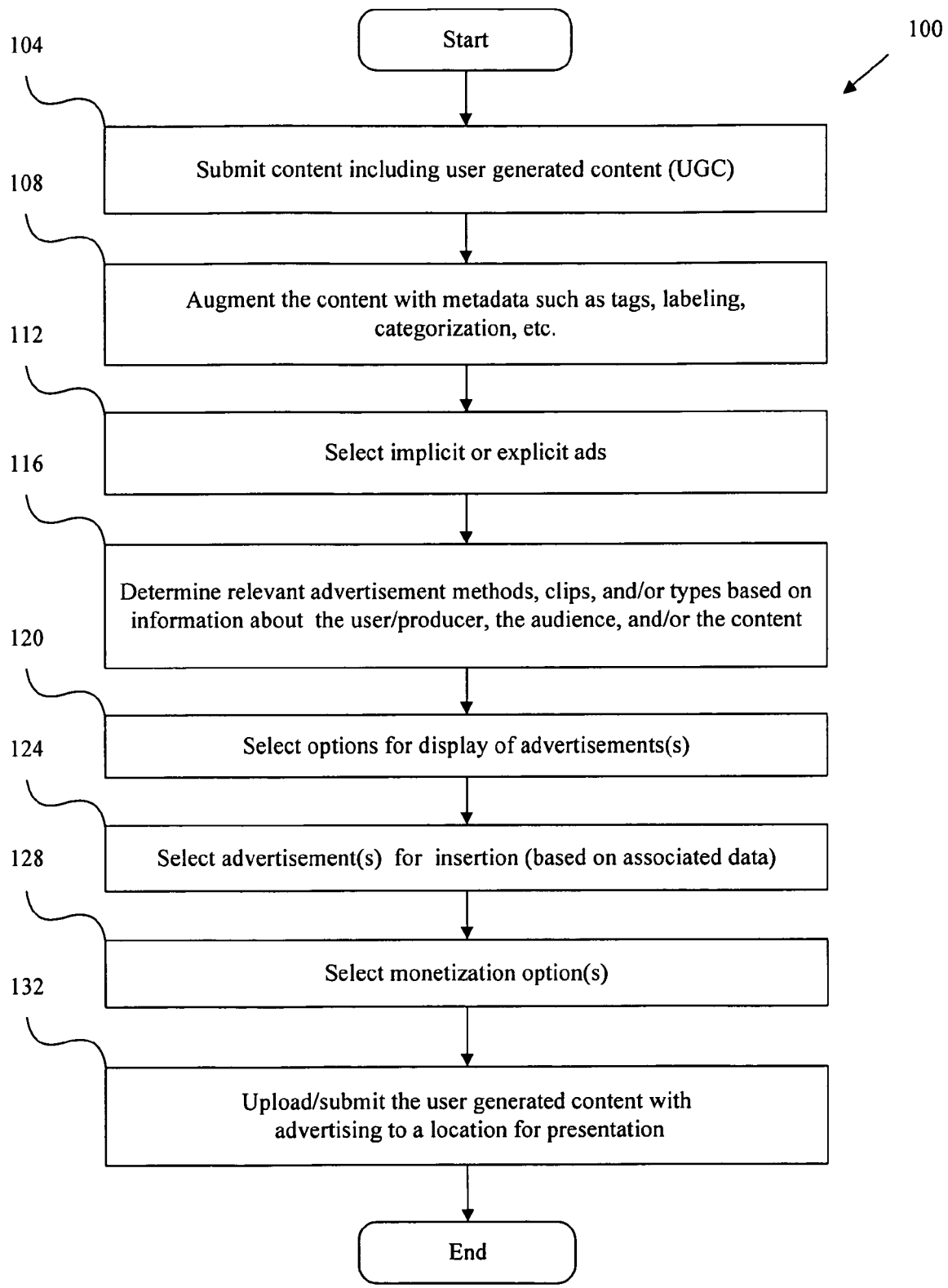
FIG. 1 illustrates a process for user insertion of advertising into user generated content.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

In the description herein, users of a media are preferably divided into publishers of the media and consumers or viewers of the media. Viewer-type users are generic users who view or interact with the media that is supplemented by the embodiments described herein. The viewers of some embodiments can not modify content or associated ads. Producer-type users include users who own, produce, capture, edit, and/or remix content such as user-generated content for submission, broadcast, and/or sharing. Producing and viewing are not mutually exclusive activities of users, as are publishing and owning content. Users may participate in multiple activities and/or interactions. Hence, users who produce media content may be viewers of the same or other content at various times. Similarly, viewers of content may also be producers of the same or different content. Operators include Internet portals, network hosts, and/or publishers. An operator operates, moderates, and maintains the system from an administrative level. Advertisers generally include advertising agencies, branding companies or companies that have brands to market, public relations agencies, each of whom promote celebrity, products, ad campaigns, or events, or even individuals looking to promote something via content sponsorship. Preferably, embodiments of the invention include self-service features and components for users, owners, advertisers, and/or operators.

The system of some embodiments allows producers of content including user generated content (UGC) to augment captured user content with advertisements. Producers of content often capture content from reality, from the real world, and/or from a virtual world that has relevance or significance to a group of users. The user generated and/or captured content generally includes video, audio, images, text, 3D animation, and/or games. The growth of user generated content on the Internet and the interest by users therein generally surpasses that of other forms of content on the Internet and other media. Embodiments of the invention capitalize on the proliferation of user generated content by serving as a medium between users who generate content (producers), and advertisers who wish to reach consumers of content. Particular embodiments enable the content producers to offer their captured content as marketing/advertising venues for advertisers. Some implementations also intelligently serve contextual ads to the viewers of content including user generated content.

In general, content producers or network operators choose to augment selected content with implicit or explicit advertising. Implicit advertising on existing content comprises overlaid or inserted product placement in a variety of forms such as, for example, audio, video, 3D/2D images, and the like. Preferably, the advertising is incorporated into the displayed content such that it appears to be a natural part of the content. Explicit advertisements are presented in conjunction with the user generated content by using pre-roll, mid-roll and/or post-roll placement and can be generated by advertisers or users or network-derived. Alternatively, explicit advertisements are inserted conspicuously on the content in a manner that is not implicit or not embedded such that the advertisement is not likely to appear as part of the content.

Further, some embodiments feature dynamic and static advertisement options. The static advertisements typically remain placed or fixed, in the same location and/or configuration, with each presentation of the content and advertisement(s). In contrast, dynamic advertising, and/or dynamic placement, changes during presentation according to contextual information based on the viewers of the content (the audience), or based on other factors. As mentioned, the placement of the advertisements within the content is also selectively static or dynamic. A particular implementation includes a self-service application for producers of content, for advertisers, or for both. In this embodiment, much of the system functionality is advantageously controlled by users and/or served automatically by the network operator.

Some automated embodiments feature an authentication service by the network operator to analyze content uploaded to the system by producers/owners to identify existing advertiser brand, logo, product, location or other ad copy within the uploaded content and to automatically tag those locations within content as venues for advertiser-specific ads. This embodiment identifies the naturally occurring "product placements" within any content and generates an ordered list of advertisers and ad venue tags based upon that analysis, enrolling one or more of the advertisers into sponsorship and revenue-sharing with producer for the now authenticated and ready for display content. When any user interacts with the content through an advertiser's tagged ad point, the advertiser is charged and the revenue is split per agreement between the network operator, the producer/owner and a publisher, if not published on the network operator's site.

Still other automated embodiments feature an authentication service by the network operator to analyze content uploaded to the system by producers/owners to identify "surface areas" within the content appropriate for overlaying with an advertiser brand, logo, product, location or other ad copy and to automatically tag those locations within content as venues for any advertisement. This embodiment identifies the naturally occurring "surface areas" within any content that satisfy a minimum threshold of factors to be appropriate venues for imbedded advertisements. For example, a large empty wall in a static video where the camera did not move would be an appropriate place for an imbedded advertisement, but the system could just as easily identify a specific color, shape or other characteristic of the media or content to identify appropriate advertisement venues for superimposition within existing content. Once identified, these areas are automatically populated with advertisements to match the venues within the content by one or more advertisers, across one or more publishers and sharing revenue with all as appropriate when any user interacts with the content through an advertiser's tagged ad point. The advertiser is charged and the revenue is split per agreement between the network operator, the producer/owner and publisher(s).

Producers of content have autonomy with respect to advertisements displayed in conjunction with their content. Accordingly, a producer advantageously selects from a variety of options for advertising. In one case, the network operator or producer selects and inserts advertising (or other content) from a set of pre-packaged ads such as, for example, during pre-roll and post-roll of the content, or as a "skin" frame for display of the content. In another case, producers generate and/or customize their own ads for presentation in conjunction with their own, or others' content. In a further alternative case, the system automatically selects and/or implements advertisement(s) in conjunction with uploaded content by using contextual information and/or meta data regarding the media, the content, the associated owner(s) or publisher(s), and/or the viewing audience. In this case, the parties make fewer decisions. The foregoing is further described next in relation to the referenced figures.

I. Ad Insertion into User Generated Content (by Users)

Accordingly, FIG. 1 illustrates a process 100 for ad insertion by a producer of content. The process 100 begins at the step 104, where a user (producer) submits content into the system. The ad insertion process optionally occurs while the producer is editing his/her content. Then, the process 100 transitions to the step 108, where the producer augments the content with metadata such as tags, labeling, categorization, marketing, etc. Next, at the step 112, the user selects either implicit or explicit ads. As described above, an implicit ad is incorporated into the content in such a manner that it appears part of the original content such as a Coke can in a video clip. Whereas an explicit ad appears to be distinguishable from the content with which it is presented such as, for example, by using conventional pre-roll, mid-roll (interstitial), and/or post-roll formats with a multimedia Coke commercial. The type of content may affect the user's choices regarding the type of advertising and the format for presentation in conjunction with the content. Hence, at the step 116, determinations are made regarding the relevant advertisement methods, clips, and/or types based on contextual information regarding the user, the audience, and/or the content including any meta data associated with the content. Some embodiments employ a combination of user selections, and system recommendations and/or selections. Some of the systems that make recommendations and/or selections for the user further allow users to tune or adjust a set of predetermined settings that affect the system-determined recommendations and/or selections, while still other embodiments are automated for both content producers/owners and advertisers by network operators.

Thus, at the step 120, the user and/or system selects the options for ad display. For instance, the following options are combined in various ways. Advertisements are inserted pre-roll, mid-roll, and/or post roll. Advertisements are used to frame content or are over-layed over or within content display layers. The advertisements of some implementations are inserted based on invisible markers set by the users, by the system, or by advertisers within the system. The invisible markers allow insertion of additional material into the user generated content. Preferably, the invisible markers remain as separate entities from the user generated content, but some embodiments generate composite entities. Advertisements are advantageously inserted by using surface areas on the user generated content that are identified by the user or by the system. Some embodiments employ image and/or shape recognition to identify relevant surface areas within the user generated content for the placement of advertising. Such technology may be similar to the face recognition technology employed by Facebook.com™. The advertising surface determination of some embodiments is further described in the U.S. patent application Ser. No. 11/646,881 [Y01553US01] entitled "SYSTEM FOR CREATING MEDIA OBJECTS INCLUDING ADVERTISEMENTS," filed Dec. 28, 2006 by Davis et al., which is hereby incorporated by reference. See also, the U.S. patent application Ser. No. 11/646,970[Y01774US00] entitled "OPTIMIZATION FRAMEWORK FOR ASSOCIATION OF ADVERTISEMENTS WITH SEQUENTIAL MEDIA," filed Dec. 28, 2006 by Raskin et al., which is hereby incorporated by reference.

At the step 124, particular advertisements such as, for example, images, text, video and/or audio clips that comprise advertising, are selected for insertion. As mentioned above, the advertisements are selected by the user/producer, by the system, and/or by a publisher. In some cases, the selected advertisements themselves are generated by the producer and/or by another user separately or in relation to the selected user generated content. When the system selects the advertisements, the system preferably selects the advertisements based on metadata provided by the producer of the user generated content, and/or based on contextual information surrounding the content, as well as audience information about the display request for the context.

At the step 128, the user selects from a set of monetization options. The monetization options of some embodiments include advertisement revenue sharing, cost per click (CPC), cost per impression (CPI), cost per action (CPA), and/or brand points. The brand-points monetization option is a point or award system that may be implemented similar to mileage points where the user redeems the accumulated points to buy goods or in exchange for other rewards. After the step 128, the process 100 transitions to the step 132, where the user submits the content with embedded advertisements to an appropriate location for presentation of the content. As mentioned above, the advertisements include implicit and/or explicit advertising. After the step 132, the process 100 concludes.

Some embodiments include a rights engine mechanism where users reserve rights to their material such as user generated content modified or submitted by using the process 100 of FIG. 1. The digital rights of some embodiments is further described in the U.S. patent application Ser. No. 11/560,320 [Y01689US01] entitled "RIGHTS ENGINE," filed Nov. 15, 2006, which is hereby incorporated by reference. These embodiments encourage users to share modified and/or submitted content in which some control over the content is retained, and further, where credit and/or revenue are attributed to the appropriate source. Such a case is described below for advertisers usage or modification of content.

II. Ad Insertion into User Generated Content (by Advertisers)

Alternatively, or in conjunction with the embodiments described above, some implementations allow advertisers to autonomously select how and where their advertisements are placed. Although these systems preferably have automated features and functionality that place the advertisers' ads on the appropriate user generated content, these implementations also permit advertisers to customize and retain as much control over the placements as they desire. For instance, various implementations permit advertisers to: (a) request or direct producers to generate specific types of content and/or place specific types of advertisements on the producers' content; (b) sponsor specific types of producer communities or individuals who generate content, and to modify the criteria used to identify such communities and individuals; (c) tap into user generated content that meets the advertiser's criteria; (d) automatically insert relevant advertisements based on the user generated content, the contextual information, and/or the meta data associated with the content; and/or (e) allow advertisers to form advertising campaigns that have greater relevance or interest to an audience or group of users.

Figure 2:
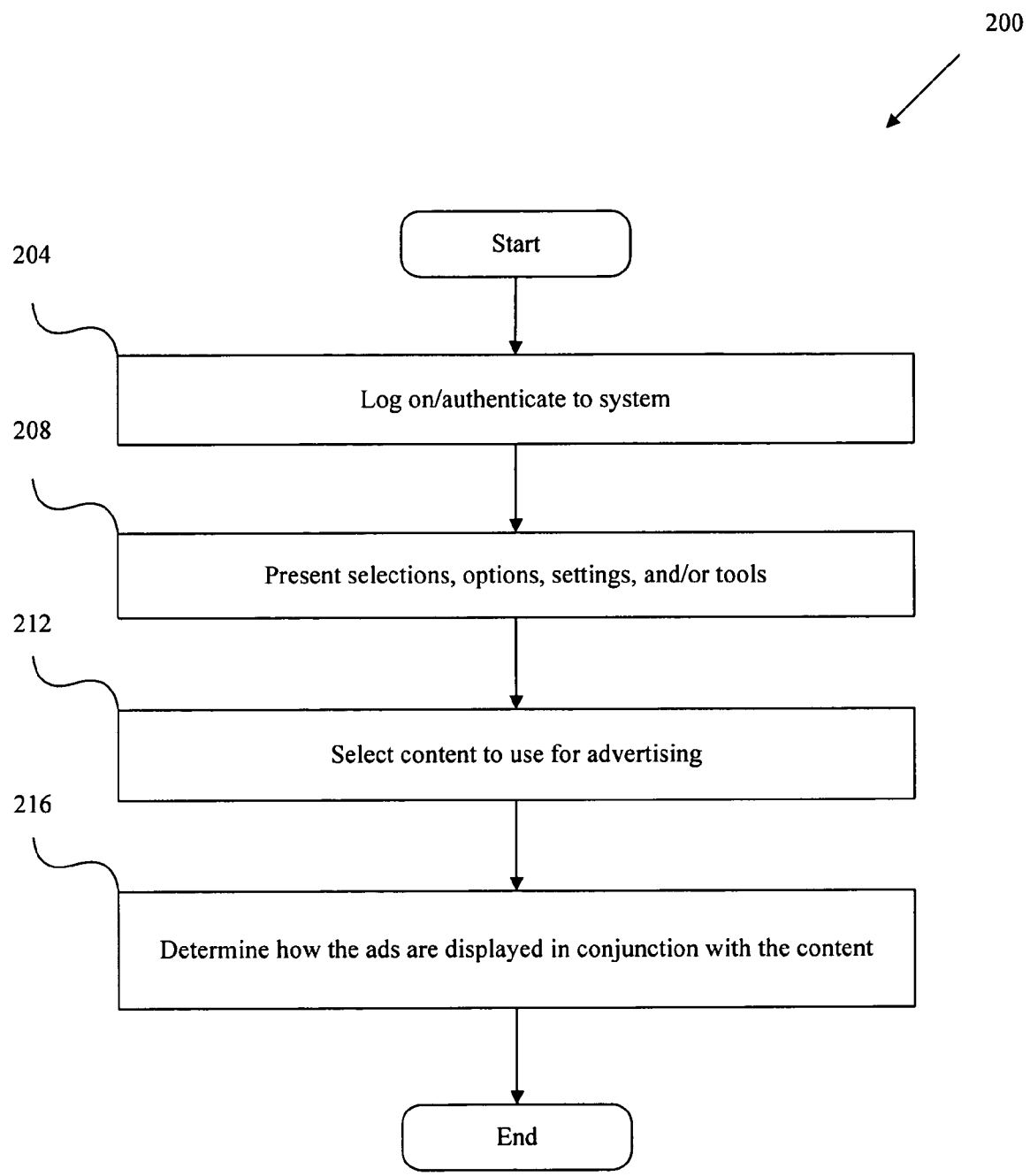
FIG. 2 illustrates a process for advertiser insertion of advertising into user generated content.

In view of the foregoing, FIG. 2 illustrates a process 200 for selecting user generated content and/or placing advertisements according to some embodiments. As shown in this figure the process 200, begins at the step 204, where an advertiser logs on to a system for the selection of content for presentation in conjunction with advertising. Then, at the step 208, the advertiser is presented with a set of selections, options, and/or configuration tools for the selection of user generated content. For instance, some systems provide an option that automatically recommends and/or selects particularly relevant or desirable user generated content for the advertiser based on the advertiser's profile. Preferably, content is recommended and/or selected for the advertiser's particular advertisements based on the advertiser's past actions and/or selected preferences. Alternatively, or in conjunction with these embodiments, the advertiser searches among registered content based on the content genre, and selects a variety of content to sponsor or on which to place advertisements. In another embodiment, the advertiser makes a request for a specific type of content or subject matter. One implementation includes requests for a specific type of content producer based on, for example, the content producer's artistic bend, popularity, celebrity status, status as a subject matter expert, or based on another aspect of the content and/or the content producer. Some implementations put a deadline for the end of submission from content producers to an advertiser's ad campaign. An additional embodiment allows users to pay for the privilege of using certain brands, advertising, persons, leading figures, identities, or clips, such as for existing advertising, on their user generated content.

Next, at the step 212, the content through which to advertise is selected. Preferably, the content includes user generated content. In some embodiments, the advertiser selects the content, while in some embodiments a configurable system selects the content for the advertiser. Once the content is selected at the step 208 the process 200 transitions to the step 216. At the step 216, the advertiser selects how the ads are displayed in conjunction with the user generated content. The advertiser sets the ad display preference for individual content and/or by using a group preference. The ad display preferences include, for example, the relevant advertisement methods, clips, and/or types. These preferences are set based on contextual information for the user, for the content such as based on the context/category or metadata, and/or for the audience. After the step 216, the process 200 concludes.

Some of the embodiments described above include a grass roots model where producers of content optionally register their user generated content such as, for example, amateur stock video or another type of user generated content. Hence, when an advertiser logs on at the step 204, the advertiser is presented at the step 208, with the user generated content submitted by various users/producers. Preferably, the upload and/or download of content and/or advertising occur in real time. The foregoing may further allow advertisers to sponsor, re-brand or remix the user generated content for advertising purposes.

III. Library Storage System for Advertising (AdPack)

Some embodiments include a library or storage system for uploading, downloading, and/or sharing of user generated content and/or advertising. These embodiments are advantageously used in conjunction with the embodiments described above for users, producers, and/or advertisers who provide advertising in conjunction with user generated content. The embodiments discussed above, allow producers of user generated content and/or advertisers to capitalize on the proliferation of user generated content (UGC) such as, for example, video, audio, images, text, 3D animation and/or games by using the delivery of such content to promote advertising to target audiences. The embodiments described in this section serve as a medium between producers of content and advertisers to allow the producers to obtain sponsorship and/or generate revenue from advertisers, and for advertisers to increase their advertisement venue(s) and impact. Further, advertisers may employ implementations of the invention in conjunction with advertising focus groups. Some implementations further intelligently serve contextual advertisements, and relevant, and/or desirable content to users including viewers of user generated content.

In a particular implementation, the library system empowers producers of content to easily add and/or combine advertisements to their own generated content, or the content of others (e.g., ad clips along with user video content). Some implementations include a stand alone application that is installed to a computing device. Alternatively, a plug-in is installed to an existing application that is used for editing user generated content. These implementations include a collection of dynamic and/or static advertisements or other media content from which users choose for presentation in conjunction with user generated content. The advertisements and other content compiled within the library generally include a variety of different formats such as, for example, a variety of image types, 3D animation, audio clips, video clips, text, email blasts, links, such as links to opt-in for mail-in advertising, flash, and the like. In one implementation, producers or users of the library insert and/or combine the advertisements or content within the library into user generated content by using a drag-and-drop type operation.

Moreover, the system of these and/or other embodiments can automatically make or assist with advantageous advertising insertions and/or recommendations for combinations of advertising and user generated content. For instance, the system of some embodiments automatically selects relevant advertising based on contextual information and/or meta data associated with the content, with relatively little user interaction. Alternatively, a hybrid automated implementation may determine recommendations for the user, however, the advertisement selection is ultimately chosen by the user/producer. Separately, or in conjunction with these embodiments, an adjustable combination of user and system input and/or control may customize the selected advertising and/or user generated content. The insertion and/or customization are advantageously based on approximation algorithms that determine the most relevant areas of the user generated content for presentation or insertion of the selected advertising.

To aid with searching and organization, the advertisements within the library are preferably categorized by topic, category, brand, geographic, personal, and/or cultural associations. Hence, some embodiments employ behavioral and/or match type engines for categorization and optionally for further targeting. For instance, an advertisement selected, placed, and/or presented with a user generated content preferably has a relevancy to the captured media content, or a relevance to the viewer audience of the captured content. Once a producer selects an advertisement from the library, some embodiments allow further customization of the selected advertisement. For instance, particular embodiments allow for more sophisticated presentation (e.g., insertion or blending) of the advertisement with the user generated content such as by using its context.

Once advertising is selected and/or customized for presentation in conjunction with user generated content, some embodiments select a monetization option, and further provide an accounting based on the selected monetization option. In one system, for instance, currency or brand points are accumulated and/or distributed to a producer who submits user generated content to the library system, selects advertising for presentation in conjunction with the submitted content, and thereby generates impressions, clicks, conversions, acquisitions, and/or advertising revenue based on the selected advertising. Approximation algorithms may further be employed to pick a desirable monetization option for the user or producer. Some implementations involve at least four scenarios for using the library of some embodiments.

(A) Submission of Content Having Pre-existing Advertisements

Initially, content including user generated content is submitted to the library of content and/or advertisements. In this embodiment, a producer-type user captures existing advertising entities such as, for example, billboards, posters, or other static, streaming, and/or virtual ads that are already on display. The producer registers the captured content with a service for sharing the revenue from the ad placement and/or presentation to an audience. Hence, the producer opts into the revenue sharing offered by the advertising revenue sharing service. One of ordinary skill recognizes that the revenue sharing includes monetary as well as other forms of credit or payment such as brand points, and the like.

Figure 3:
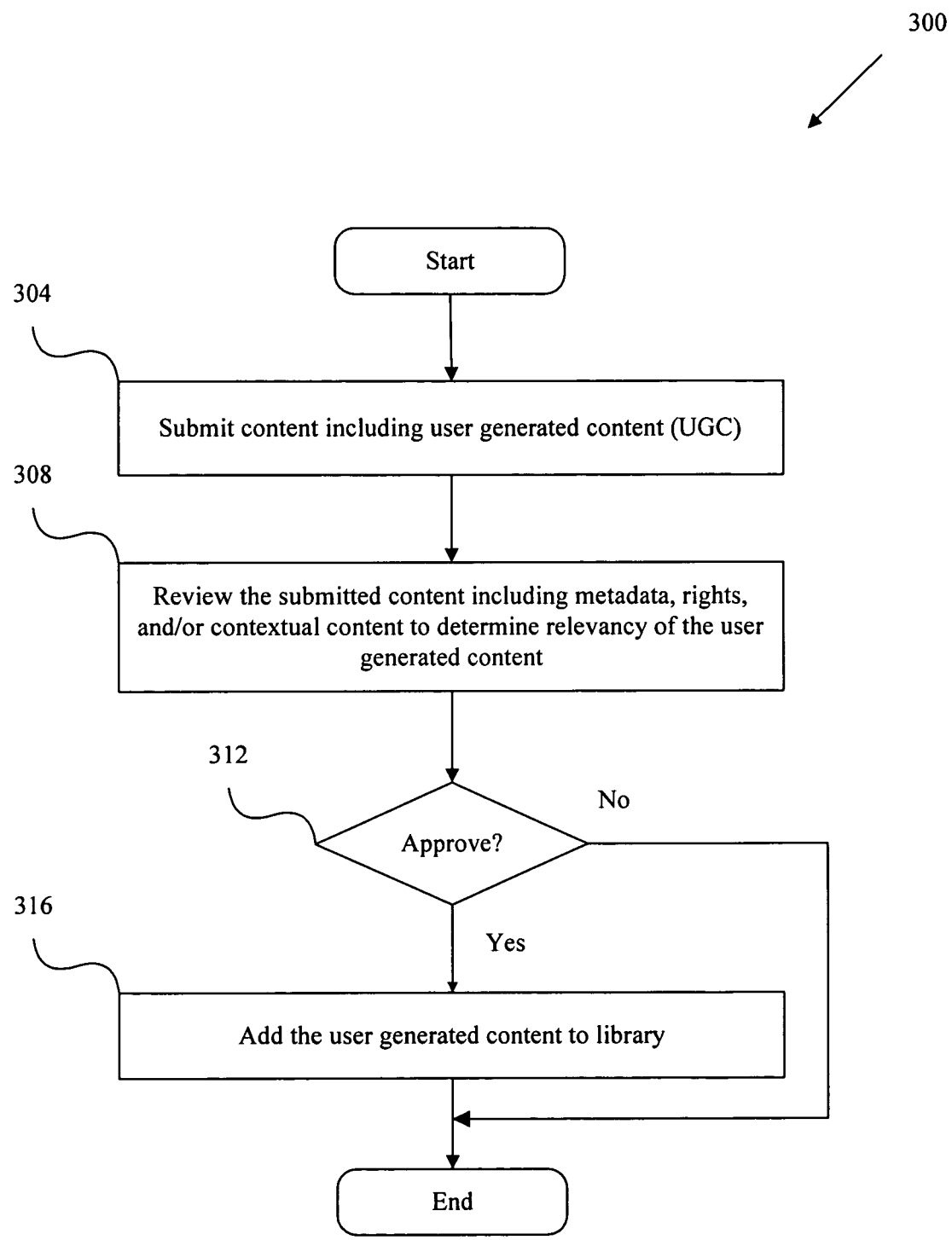
FIG. 3 illustrates a process for using a library of advertisements of some embodiments.

For instance, FIG. 3 illustrates a process 300 for submission of a first user generated content. In one embodiment, the first content has an existing advertisement included within the first content. Hence, there is potential for revenue sharing of the advertisement captured within the generated or captured content. The process 300 begins at the step 304, where a user (producer) registers the producer's generated content into a system. For instance, the first content may be registered as having included advertising for a specific brand or advertiser. At the step 308, the producer's content is reviewed including any meta-data, rights, and/or contextual content associated with the producer's content. Further, the process 300 determines the attributes and relevancies of the producer's content. Then, at the step 312, a determination is made whether to approve the submitted (first) content. If the content is not approved at the step 312, then the process 300 concludes. If approved, then the producer's content is added, at the step 316, as part of an advertisement and/or content library (i.e., as part of the Ad Pack). Once the content with its included advertisement(s) within the content is approved, allowed, and/or added, other users are permitted to download, use, remix, and/or augment other content by using the producer's (first) content. Also, at the step 316 some implementations calculate the monetization value for the producer based on the use by others of the producer's first content. Moreover, some of these implementations compensate the producer of the content appropriately, at the step 316. After the step 316, the process 300 concludes.

In an alternative embodiment of the process 300, an advertiser, marketer, or brand company selects specific types of submitted user generated content to sponsor. The content selected for sponsorship likely has popularity among users, or has particular relevance. The advertiser, marketer, and/or brand company sponsors the content financially, or through another means of compensation such as credit or brand points.

(B) User Inclusion of Advertisements with Content

In a second case, a user (producer) selects and/or modifies content including user generated content for presentation in conjunction with advertising. The advertising is preferably retrieved from a library of submitted advertisements for inclusion into user generated content. In this case, the selected advertisement may be inserted into the producer's content pre-roll, mid-roll, post-roll, and/or by using another format.

Figure 4:
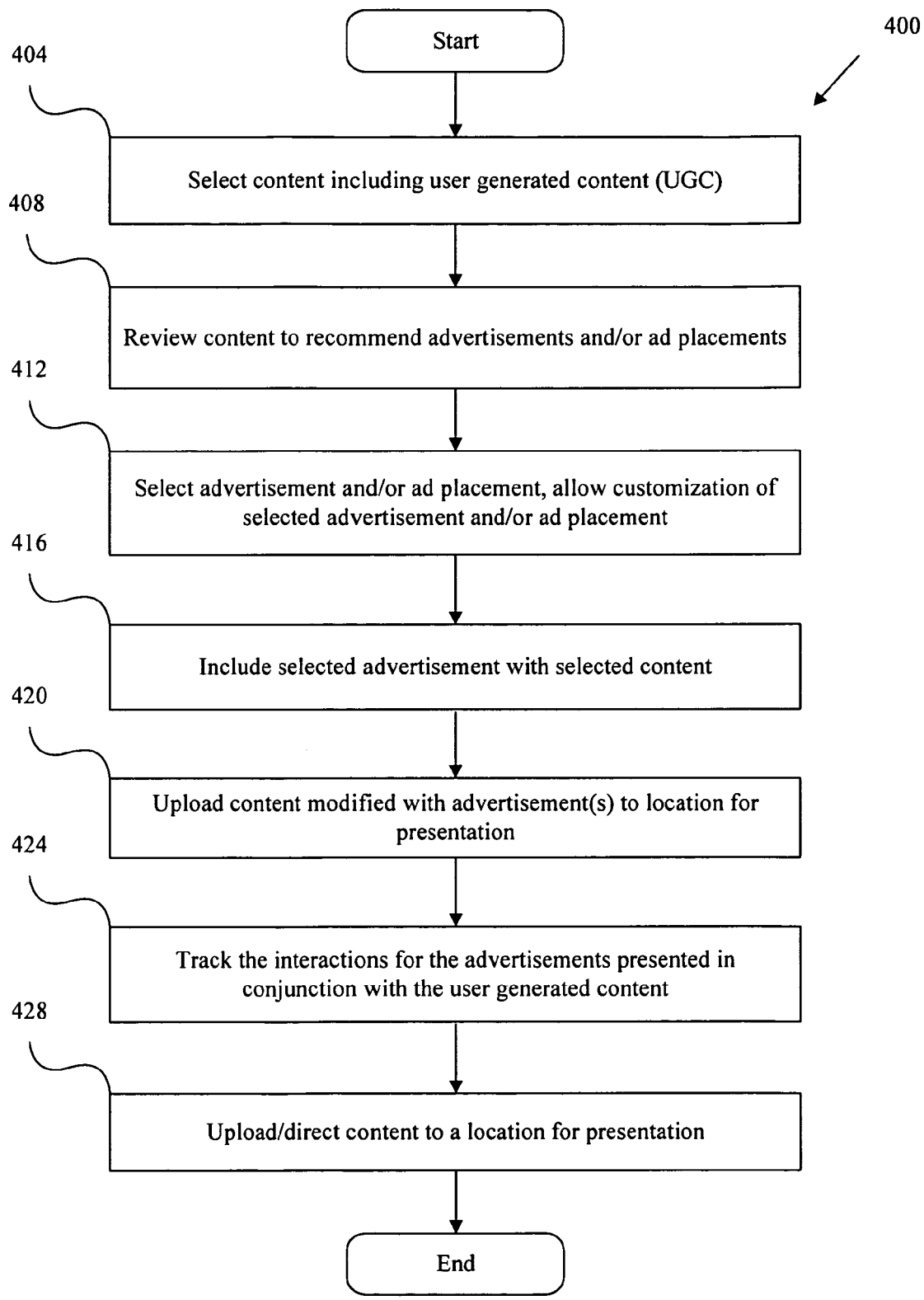
FIG. 4 illustrates a process for using a library of advertisements of some embodiments.

FIG. 4 illustrates such a process 400 for user selection and modification of content in conjunction with advertising. The process 400 begins at the step 404, where a user selects content such as user generated content. The content includes the producer's own generated content, or the content of others. Further, the content is stored and/or retrieved locally on the user's computer or remotely within an online library of content. Some implementations more specifically include an application having an interface and an edit mode to interact with various user generated content and/or advertisements such as those stored in a library of advertisements (e.g., an Ad Pack). At the step 408, the selected user generated content is reviewed. For instance, the application may further include a review module that performs the review in an automated manner. In particular, the meta-data, rights, and/or the contextual content associated with the submitted content are reviewed. Preferably, advertising such as advertisements of a variety of different forms, clips, and/or ad placements are recommended for the user.

At the step 412, the user selects and customizes the selected advertisements, clips, and/or ad placement(s). As mentioned above, an automated system may assist the user by presenting recommendations, or may perform the selection for the user in an automated fashion, at the step 412. After the step 412, the process 400 transitions to the step 416, where one or more advertisements are included with, inserted into, or otherwise adapted to conform or be presented with the user generated content, preferably according to the customization specified by the step 412. Then, at the step 420, the content is uploaded or directed to a location for the presentation of the content in conjunction with the selected advertising. The location for presentation and/or one or more details of the display are preferably chosen by the user.

At the step 424, the process 400 tracks the impressions, click-through, and/or other conversion type activities of the advertisement(s) selected for presentation in conjunction with the selected and/or modified user generated content. The click-through preferably includes a number of clicks and a click through rate. Some embodiments include particular embedded tracker code for tracking the conversion type activities such as the click rate. At the step 428, the foregoing information is uploaded to a system that calculates the monetization value for the user. Some embodiments further compensate the user appropriately for the conversion type activities associated with the user's selections for advertising and/or user generated content. The tracker code of some embodiments performs the functions of the step 428. In some of these embodiments, the tracker code operates in cooperation with a system for tracking and managing multiple activities relating to advertising and user generated content and/or the library of content and/or advertisements. After the step 428, the process 400 concludes.

(C) Variation of User Adaptation of Content

In a third case, the user opts for automation of advertising placement and/or presentation in conjunction with user generated content. These cases preferably involve dynamic advertising in conjunction with the content. The user optionally sets some preferences such as, for example, the user may identify surface areas on user generated content for the placement of advertising, set markers within the user generated content for ad placements, choose ad genre, and/or choose a monetization type. Regardless of the user selected preferences, the remainder of the placement operations are performed by an annotation system of some embodiments. The advertisement(s) are placed automatically by the system based on contextual information and/or meta data associated with the user generated content, associated with viewers of the content, with the producer of the content, and/or associated with the selected/recommended advertisement(s). This system preferably uses a library of stored information, content, and/or advertising.

Figure 5:
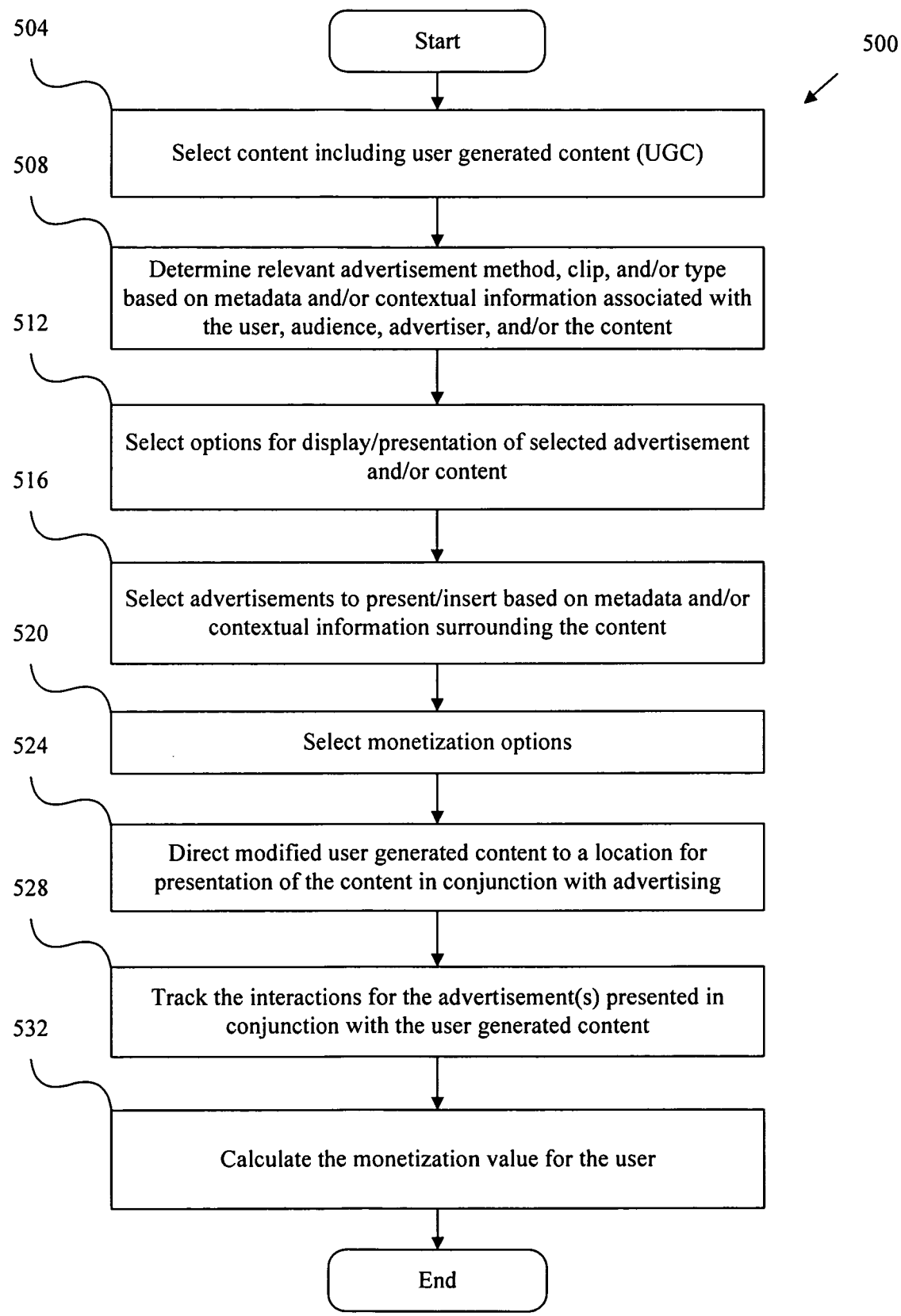
FIG. 5 illustrates a process for using a library of advertisements of some embodiments.

FIG. 5 illustrates a process 500 for the dynamic placement and/or presentation of advertising in conjunction with user generated content. The process 500 begins at the step 504, where a user selects user generated content. The content is preferably selected from a library for content and/or advertisements such as by using an edit mode, in accordance with some embodiments. Then, at the step 508, a system application determines a set of relevant advertisement methods, clips, and/or types based on contextual information for the user, the content, the audience, meta data, and/or other information associated with the content.

At the step 512, the user selects options for advertisement display. For instance, the user may select various combinations of the following preferences. The adaptation, insertion, and/or presentation of the advertising are optionally pre-roll, mid-roll, and/or post-roll. Further, the advertising insertion is selectively based on invisible markers set by the users, the system, or by the advertisers within the system. The invisible markers insert additional material into the user's selected content. In some implementations, the additional material remains as a one or more entities or objects that are separate from the submitted user generated content. In some options, the insertion or inclusion of advertising is through surface areas on the user generated content that are identified by the user or by the system. For instance, the system of a particular implementation uses image and/or shape recognition to identify relevant surface areas on or within the content. As mentioned above, such technology is similarly implemented in conventional face recognition technology such as by Facebook.com™ and other photographic applications and sites. Users further advantageously adjust the recommendations and/or automations provided by some of the foregoing system implementations.

At the step 516, one or more advertising clips are selected for placement, insertion, and/or presentation in conjunction with user generated content. The advertising clips are optionally selected by the system, selected by the user, and/or generated by the user for insertion. When selected by the system, the advertisements are preferably selected based on meta data provided by the producer of the content, and/or based on the contextual information surrounding the generated content. At the step 520, monetization options are presented from which the user may select. Examples of monetization options include ad revenue sharing, pay per click (PPC), and/or pay per impression (PPI). Then, at the step 524, the user directs the selected and/or modified user generated content with the selected advertising to an appropriate location for presentation and/or display. The advertising and content is optionally stored together, such as for embedded advertising, or alternatively, is stored separately. Some embodiments further include and store (separately or together with the content) embedded tracker code that tracks conversion and/or usage activities for the content and/or advertising. Such activities include, for example, the number of clicks, and the click-through rate for the advertising presented in conjunction with the content. At the step 528, activity is tracked and/or monetization is calculated for the user. In some implementations, tracker code uploads information to a system for managing the activities relating to the content, the advertising, and/or the library. The system of these implementations may further compensate one or more users based on the tracking and calculations. After the step 528, the process 500 concludes.

(D) User Search for Specific Content

In a fourth case, brand conscious users, or those users/producers having an affinity for celebrity, search for specific content and/or advertisements. When a user locates desirable content and/or advertisements, the user opts to pay for brand/celebrity placement on the user's selected or generated content. The user may choose to augment the user's own content or the content of another such as by using an advertising and/or media library of some embodiments. For example, a user Marsha has a daughter who has an affinity for a celebrity such as Brad Pitt. As a surprise, Marsha pays for a clip of Brad Pitt singing Happy Birthday to Marsha's daughter in a birthday video. In another example, a user Rob has an affinity for NASCAR. Rob searches the library of some embodiments for NASCAR content and/or advertisements. Rob then expressly opts to place selected NASCAR logos that are pre-approved for use on all his user generated content. For instance, Rob's user generated content often depicts his vehicles, and his vehicles have surfaces that include NASCAR logos that Rob selects and places within his content. More specifically, Rob's Facebook.com™ and Flickr.com™ pictures of his car have NASCAR logos superimposed onto the online shared images.

Figure 6:
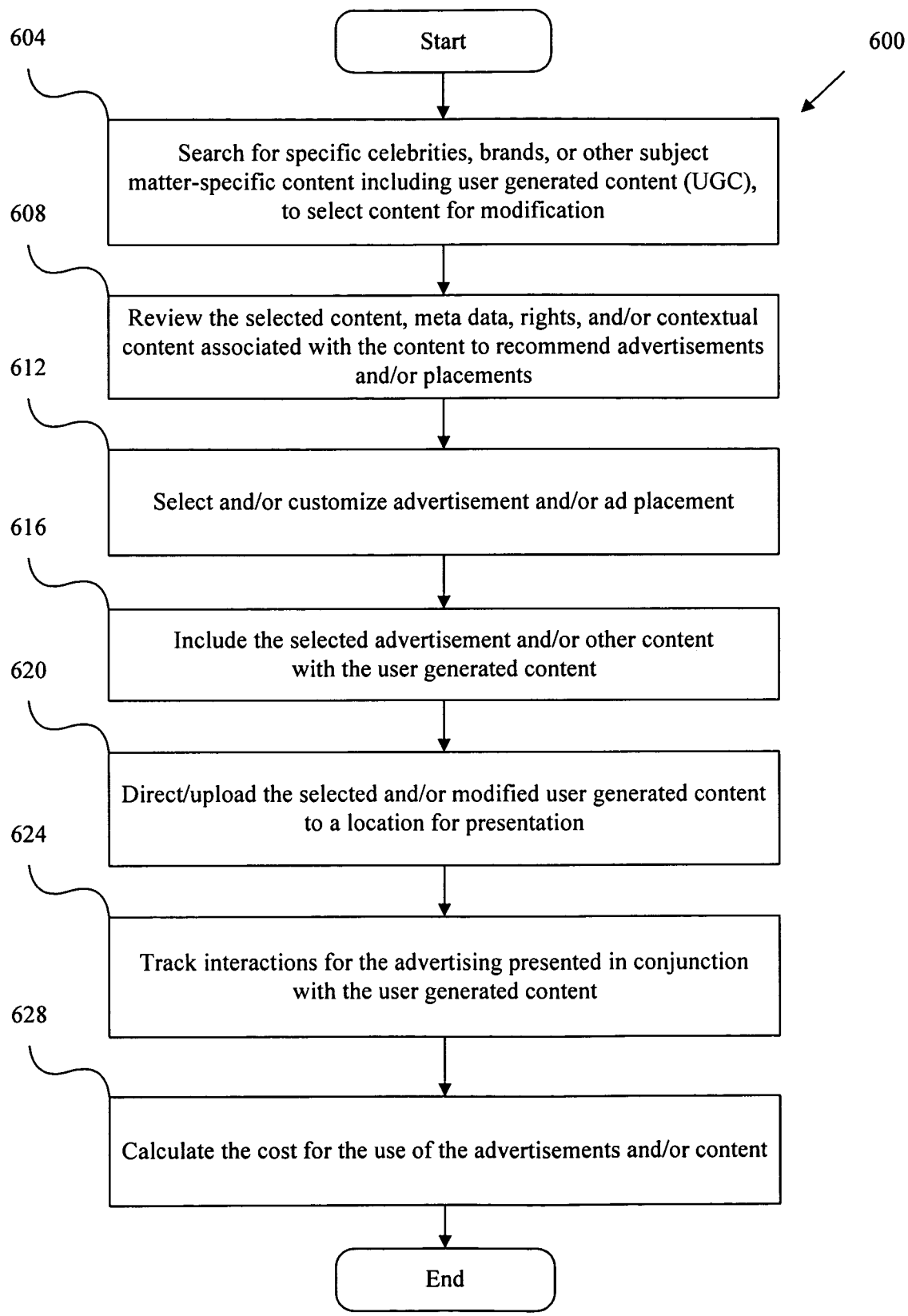
FIG. 6 illustrates a process for using a library of advertisements of some embodiments.

In view of the foregoing, FIG. 6 illustrates a process 600 for producing or augmenting content having such modification. The process 600 begins at the step 604, where a producer selects a first content including user generated content for augmentation. The content of some embodiments is selected by using a mode of a media editing application. In a particular embodiment, the user searches for specific subject matter such as, for example, celebrities, brands, or other content having specific features desirable to the user. Some embodiments assist the user with the search by providing additional search tools. Further, some embodiments provide an online library or repository for content and/or advertisements in conjunction with the search tools. Preferably, the user makes a first selection from the online library. Alternatively, the user submits additional content to the online library for selection.

At the step 608, the selected first content is reviewed. Some embodiments review meta data, rights, and/or contextual information associated with the first content. A particular implementation uses the rights engine incorporated by reference above. Further, some embodiments recommend to the user particular advertising clips, other content, and/or ad placements based on the information associated with the first content. At the step 612, a particular second content including advertising clips and/or ad placements is selected and/or customized. After the step 612, the process 600 transitions to the step 616, where the selected second content and/or advertising is included, combined, added, and/or inserted into the first content as specified at the step 612. Then, the process 600 transitions to the step 620, where the first and/or second content are directed or uploaded to a location for presentation of the combined content. At the step 624, presentation information regarding the combined content such as the number of views or the click-through of the first and/or second content is tracked. For instance, the number of views or plays of a celebrity singing happy birthday or the number of NASCAR logos displayed is tracked. Some embodiments include tracking code that is embedded within the content to facilitate functionally. Moreover, the code of some embodiments directs the tracking and other information to a server for performing the tracking functions. Some of these embodiments may calculate any revenue for the user, or alternatively, may instead calculate the cost for the user's use of the content. For instance, where the first or second content include content generated by another user, or including a brand or celebrity that has particular rights value, the user may be charged for the use of the other's (shared) content. Also at the step 624, a server tracks multiple activities relating to the use and presentation of the content including revenue sharing and cost activities. After the step 624, the process 600 concludes.

In some implementations of the process 600 described above, the user has the option of generating their own advertisements or other additional second content, and combining the second generated content into their own or another's first generated content. Preferably, the generation of the second content and/or the modification of the first content is performed by the user with the assistance of the system such as, for example, by following pre-written scripts or by remixing media with pre-existing advertising, or further by generating advertising ad-hoc.

The foregoing describes various processes, systems, engines, and/or library storage and retrieval structures by which advertisers advantageously extend their outreach for advertising. Further, users of different types including producers and even advertisers, form brand associations, and proliferate their content in novel, interesting, and useful ways. User selected brands advantageously build upon user type content, while user content is promoted by certain brands in a collaborative manner. Moreover, users generate revenue streams with user generated content. Some content advantageously includes associations, affinities, and/or elitism to better engage a viewing audience such as, for example, by including celebrity and/or brand appearances, voiceovers, and the like. Next, several system and other example implementations are further described.

III. Systems and Examples

Figure 7:
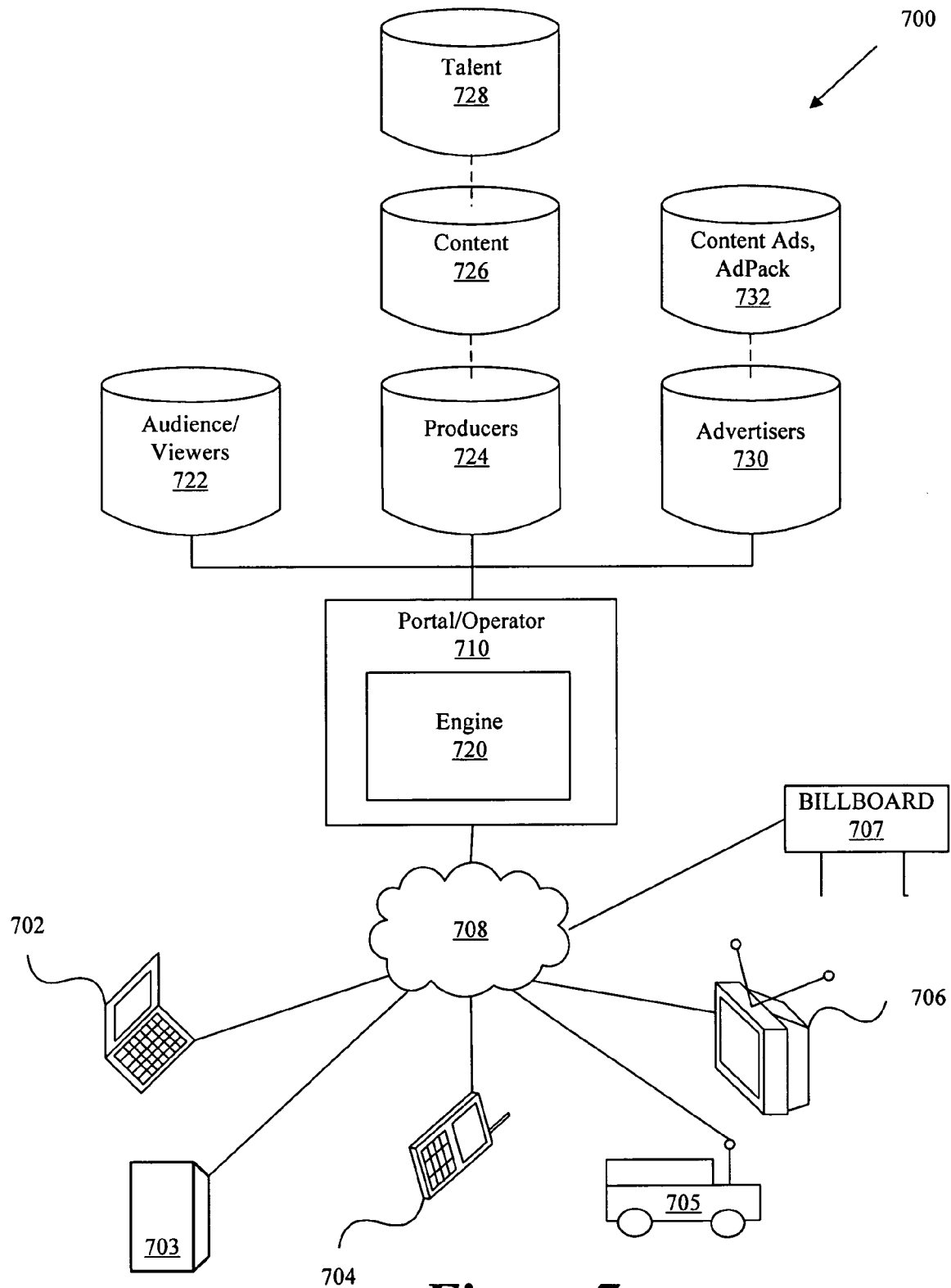
FIG. 7 illustrates a network system for the selection and presentation of advertisements.

FIG. 7 illustrates a system 700 for the selection and presentation of advertisements. As shown in this figure, the system 700 includes several users 702, 704, and 706 that are coupled through their respective devices to a network portal 710 through a network 708. As illustrated in the figure, the users 702, 704, and 706 use a variety of different devices for interacting with the portal and/or operator 710. Moreover, coupled to the network 708 are a number of common and unusual networked devices including a computer 703, an enabled vehicle 705, and a billboard 707 for providing input and/or output of data including, for example, multimedia content to and from the network 708, and the various users and networked devices. The network 708 includes various types such as, for example, local area networks, wide area networks, and/or networks of networks such as the Internet. Generally, the portal/operator 710 stores a variety of data and information and provides several services to the users. Preferably, the users include different user types such as publishers who generate content, advertisers who provide advertising, and viewers who view the content and/or advertising.

Accordingly, the portal/operator 710 has an engine 720 and several data storages for managing the information relating to each user type and each activity for each user. For instance, the portal/operator 710 has a storage location for each of the viewers or audience 722, for the producers 724, and for the advertisers 730. Advantageously, the data for some groups is further subdivided. In particular, the data for producers 724 preferably has data for content including user generated content 726 that is associated with the producers 724. Further, the content data 726 may have data regarding talent 728 that is associated with the content 726. The advertiser data 730 typically has related advertising data 732 including ad campaigns and/or specific advertisements. As further described below, the users (including publishers, advertisers, and/or viewers) advantageously interact with the portal/operator 710 for the generation of content, and/or the presentation of advertising in conjunction with the content.

Figure 8:
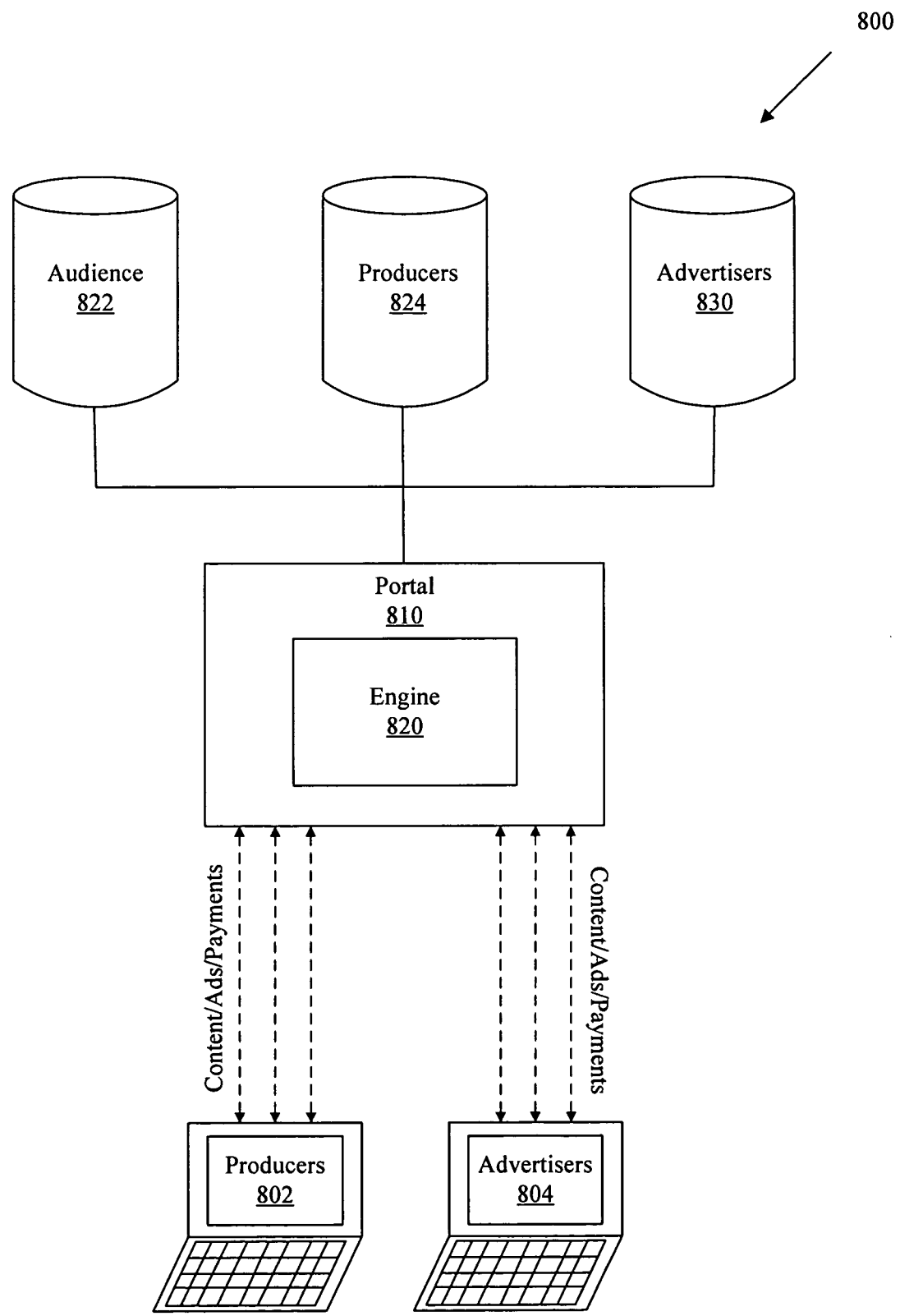
FIG. 8 illustrates a network system in further detail.

FIG. 8 illustrates the operation of a system 800 in further detail. As shown in this figure, the system 800 includes one or more producer type users 802 and one or more advertisers 804 who interact with a portal/operator 810. The portal 810 includes an engine 820 and several exemplary data storages 822, 824 and 830, to service the interactions of the producers 802 and the advertisers 804 with the portal 810 and the engine 820. Generally, the interactions are of various types including, for example, the exchange of content, advertisements, and/or payment. For instance, a producer 802 may upload content generated by the producer or by another, and/or may similarly download content such as user generated content. A producer may select or have selected an advertisement from a library of stored advertisements through the portal 810 and/or engine 820, for inclusion or combination with a user generated content also selected by the producer, or selected for the producer by the engine, or generated by the producer. Further, the producer may generate an advertisement and/or submit the advertisement for inclusion in the library of shared advertisements. Moreover, the interactions generally include monetization type interactions. For instance, when content or advertisements submitted by the producer are used, payments accrue or are sent to the producer. Conversely, when the producer selects, downloads, or otherwise uses content and/or advertisements that are generated by another user there may be a cost associated with the use that is assessed to the producer.

The advertisers 804 also have a variety of interactions through the portal 810 and engine 820. For instance, the advertisers 804 typically provide advertisements for an ad campaign that is included by the engine 820 in a library of shared advertisements. The advertisements are for use by publishers in conjunction with user generated content that is presented to viewers. Further, advertisers may select, download and/or use content including user generated content for particular advertisements, or may provide content for which the advertiser encourages user development of creative advertising. Moreover, the advertiser 804 has monetization type interactions such as, for example, payments for using user generated content from a shared library of content, for advertisements generated by publishers/users, and for other types of payments.

Figure 9:
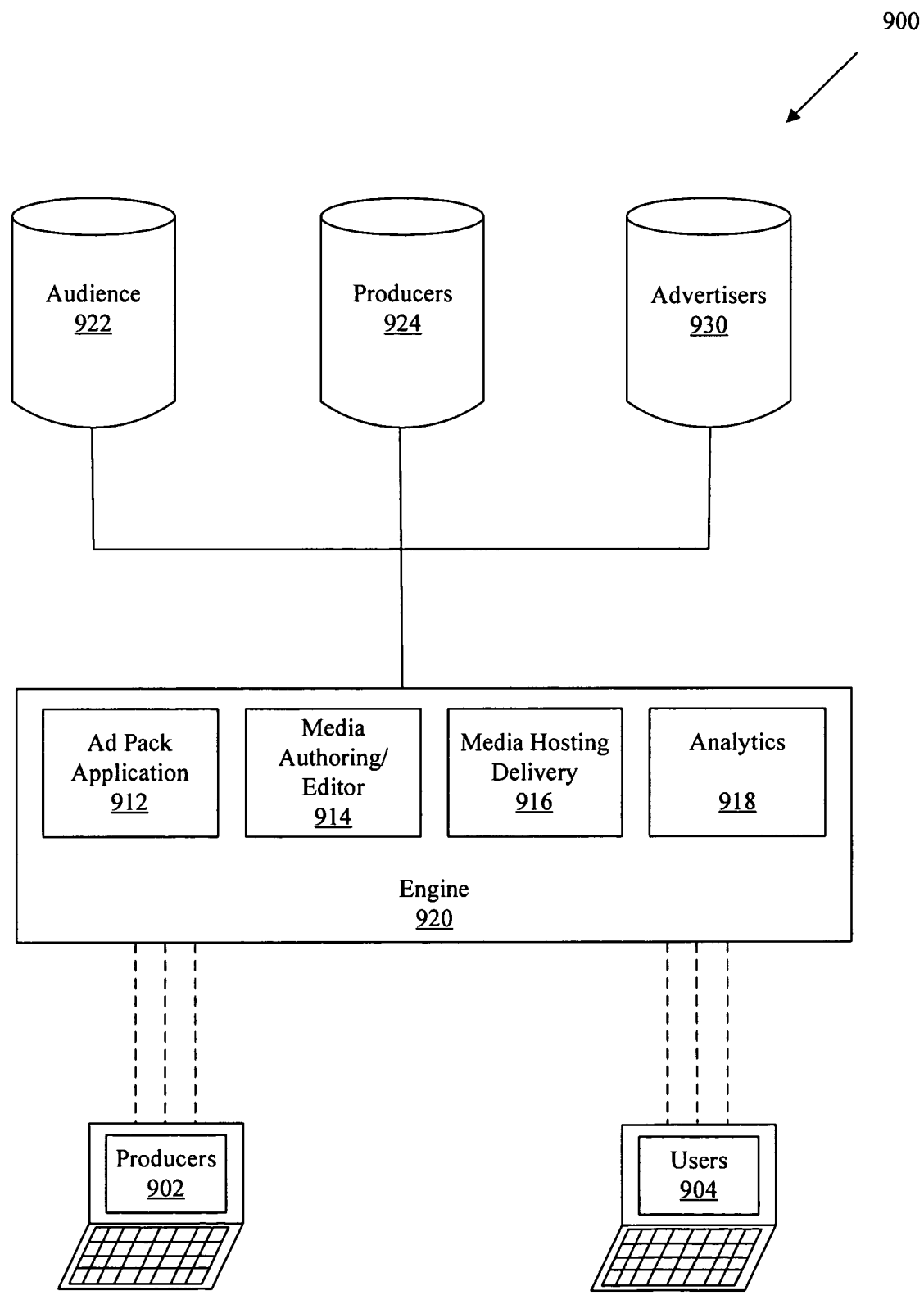
FIG. 9 illustrates a system implementation of some embodiments.

FIG. 9 illustrates an implementation of an engine 920 of some embodiments. As shown in this figure, the engine 920 includes an application 912 for interfacing with an advertising library (i.e., an Ad Pack), a media authoring tool such as an editor application 914, a media hosting and delivery module 916, and an analytics module 918. The engine 920 is coupled to exemplary data storages 922, 924 and 930, for management of a variety of information. One or more producers 902 and other users 904 interact with the engine 920 and the information within the data storages. For instance, in a particular embodiment, the producers 902 employ the applications and modules of the engine 920 to edit and manipulate user generated content. More specifically, a producer 902 advantageously selects by using the engine 920 an advertisement that is stored by the data storage 930. The selected advertisement is for presentation in conjunction with user generated content that is also selected and/or manipulated by the producer 902. The engine 920 of some implementations includes software and/or hardware for execution of the processes 100, 200, 300, 400, 500, and/or 600 described above with respect to the FIGS. 1 through 6.

Figure 10:
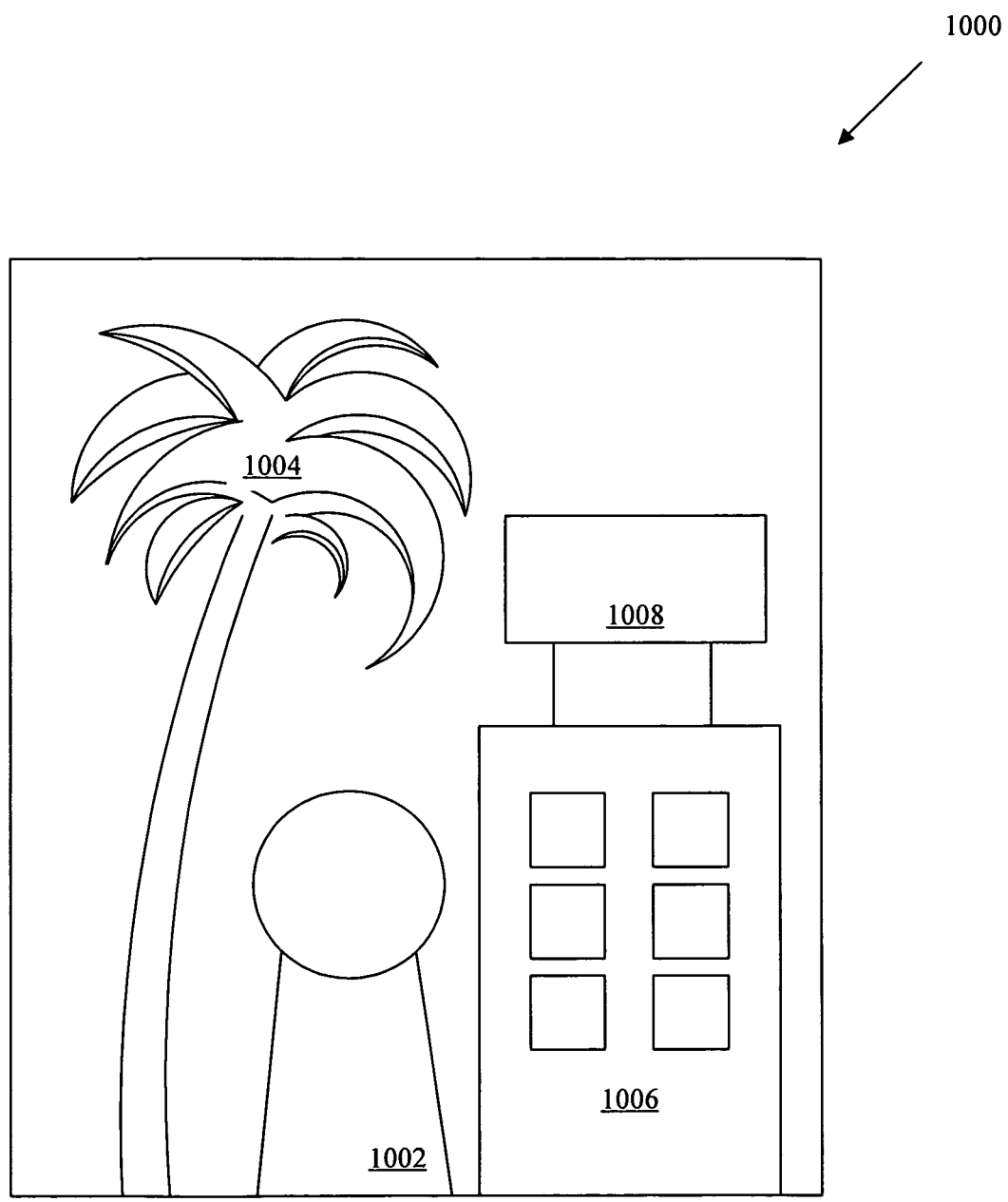
FIG. 10 illustrates content modification such as by ad insertion according to an embodiment.

FIG. 10 illustrates an implementation that prepares content and/or advertising for presentation according to an embodiment. As shown in this figure, a user generated content 1000 includes an image frame that has a person 1002 in the foreground and a tree 1004, a building 1006, and a billboard 1008 in the background. The illustrated user generated content 1000 is a still image from a photograph or an image frame from a video. One of ordinary skill, however, recognizes the many forms of user generated content including different forms of video, audio, and images. As described above, the user generated content 1000 is selected at various times for presentation in combination with selected advertisements. For instance, in one embodiment, a producer submits the user generated content 1000 to a sharing resource for access by viewers, advertisers, and/or other producers. The sharing resource may include one or more of a server, an engine, and/or storage device(s) that implement a library of shared content and/or advertisements.

In some embodiments, the producer or another entity edits the user generated content 1000 for presentation in conjunction with advertising such as by including the advertising within the user generated content 1000. Alternatively, the user generated content 1000 is selected for an advertiser or for an advertisement. The selection is optionally made by the advertiser or in an automated manner by a system of some embodiments. The system of these embodiments may further perform the editing of the user generated content 1000, editing of the advertisement, and/or the presentation of the advertisement in conjunction with the user generated content 1000.

As mentioned above, the editing and/or presentation are performed in various ways. For instance, for this type of image content, surfaces are identified for the placement of advertising. In this example, the person 1002, the tree 1004, the building 1006, and/or the billboard 1008 may each be identified for the placement of advertising. The identification may be performed by the user (a producer, or an advertiser) or by a system such as the engine 920 described above in relation to FIG. 9. Some embodiments perform the identification of advertising surfaces on-demand for submitted content, while some embodiments perform the identification in real-time for users as content is generated and/or captured. For instance, a system performs the identification for submitted content. Alternatively, the system or an enabled device provides identification for advertising surfaces while content is being generated and/or captured. An image device includes image and/or video capturing devices such as a digital camera, camera phone, and/or video camera. For these devices, a system may provide the identification of advertising surfaces through a network connection, or the device may be enabled to perform the identification by using internal software and/or hardware.

Further, for users who use an enabled reality capturing device, some embodiments calculate and/or display to the user the amount of revenue available if the user captures specific types of content. By pointing the capturing device over a location or object, the user receives real time advertising quotes and conditions, instructions and scripts of how the location or object is optimally used in relation to advertising, an advertiser, or an ad campaign. Some embodiments use Virtual Universal Translator technology to receive advertising revenue information for locations, physical things, objects, and/or surfaces. For example, a user Lenny captures her friends' boat trip. Lenny uses an enabled video camera that indicates that if she shoots video of her friends on a boat drinking Heineken, Heineken will pay her three cents per presentation, impression, or click for her video having the Heineken brand displayed therein. In some implementations, the brand company provides the device to the user for the user to generate content for advertising the particular brand. The virtual universal translator technology of some embodiments is further described in the U.S. patent application Ser. No. 11/874,421, entitled "VIRTUAL UNIVERSAL TRANSLATOR" filed Oct. 18, 2007, by Athellina Athsani and Chris Kalaboukis [Yahoo reference Y02544US00], which is incorporated herein by reference.

Regardless of whether the identification of advertising surfaces (or placements) is performed in real-time, preferably the user (producer or advertiser) is presented an indication of the identified advertising surfaces. Hence, for the content 1000 of FIG. 10, the user is given indications of potential advertising surfaces such as the person 1002, the billboard 1008, or another portion of the image 1000, such as the person's head, or an article such as a hat on the person's head. The identified surfaces within the user generated content may be referred to as the users' or the contents' "inventory" for the placement of advertising.

Figure 11:
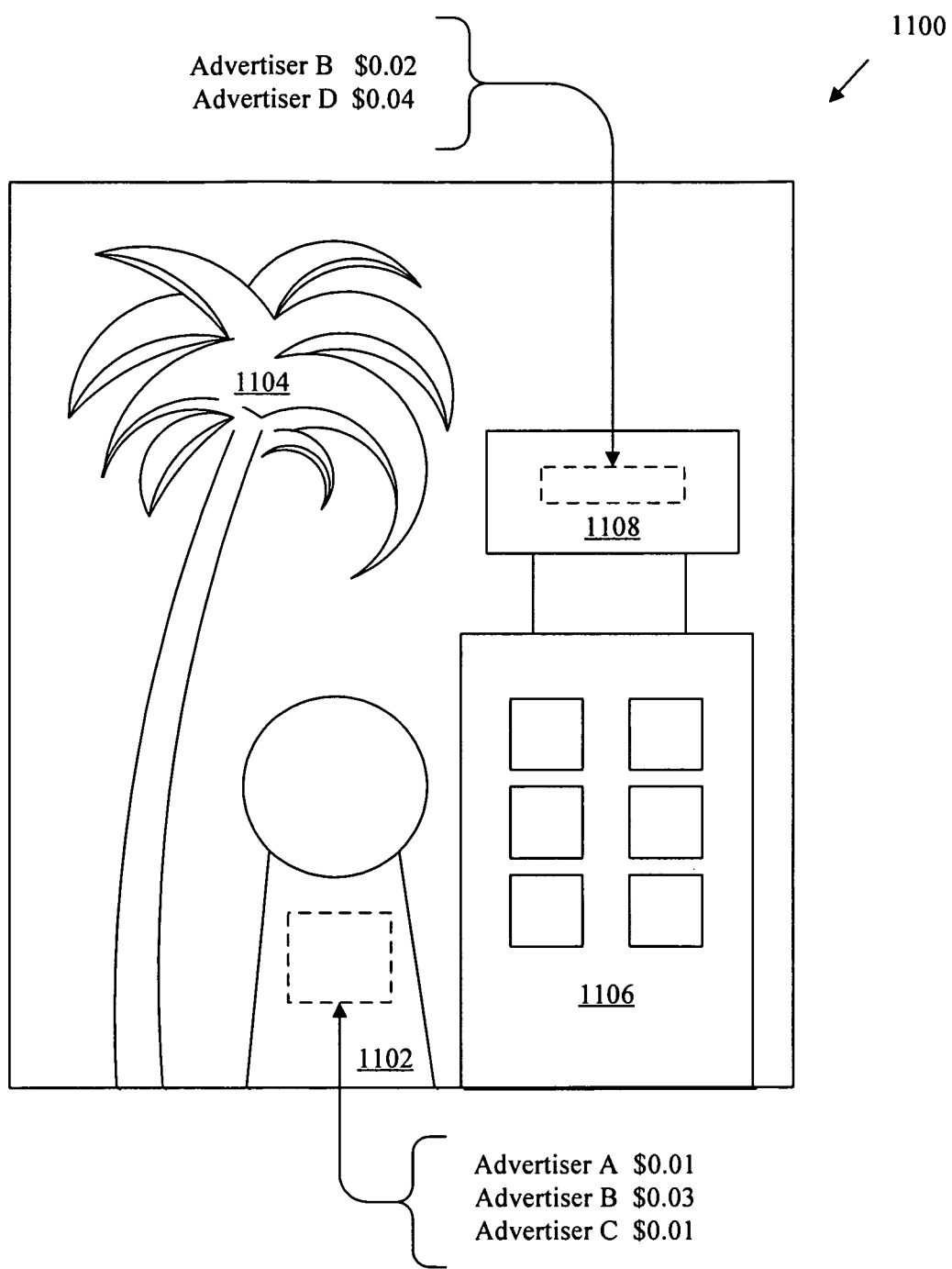
FIG. 11 illustrates further the content modification of an embodiment.

Once the advertising surfaces are identified, some embodiments display monetization for the surfaces, and may further include the pricing for such monetization. For instance, four advertisers (A, B, C and D) might be willing to pay for the insertion of advertising into the user generated content 1000 such as onto the person's shirt 1002 or onto the billboard 1008 of FIG. 10. FIG. 11 illustrates three exemplary advertisers that wish to advertise by using the person's shirt 1102 within the user generated content 1100. As shown in this figure, the exemplary Advertiser "A" is willing to pay $0.01 for advertising on the person's shirt 1102, Advertiser "B" will pay $0.03, and Advertiser "C" will pay $00.01. As recognized by one of ordinary skill, the values are merely illustrative and further, the values represent the price for a number of different conversion metrics such as, for example, price or cost per impression, per click, per lead, per acquisition, or per another conversion metric. Also illustrated by FIG. 11, advertisers may have an interest in advertising by using other features of the content 1100 such as the billboard 1106. In this example, the Advertiser "B" will pay $0.02, and the Advertiser "D" will pay $0.04 (e.g., per impression) to advertise by using the billboard surface of the producer's content. In some embodiments, the monetization pricing is determined by a bidding process for the content and/or for the surface(s).

Next, an advertiser or advertisement is preferably selected for one or more of the identified surfaces. A producer may select an advertiser based on the monetization information, or based on a preference for the advertiser, or for a type of advertising. For surfaces that do not include monetization information, an advertiser or advertisement is selected for the producer, for the content and/or for the surface, based on other criteria. Alternatively, an advertiser or advertisement is selected by using an automated system process. Moreover, an advertiser may select the content and/or surface for advertising, or the content and/or surface are selected for the advertiser by using an automated system process.

Figure 12:
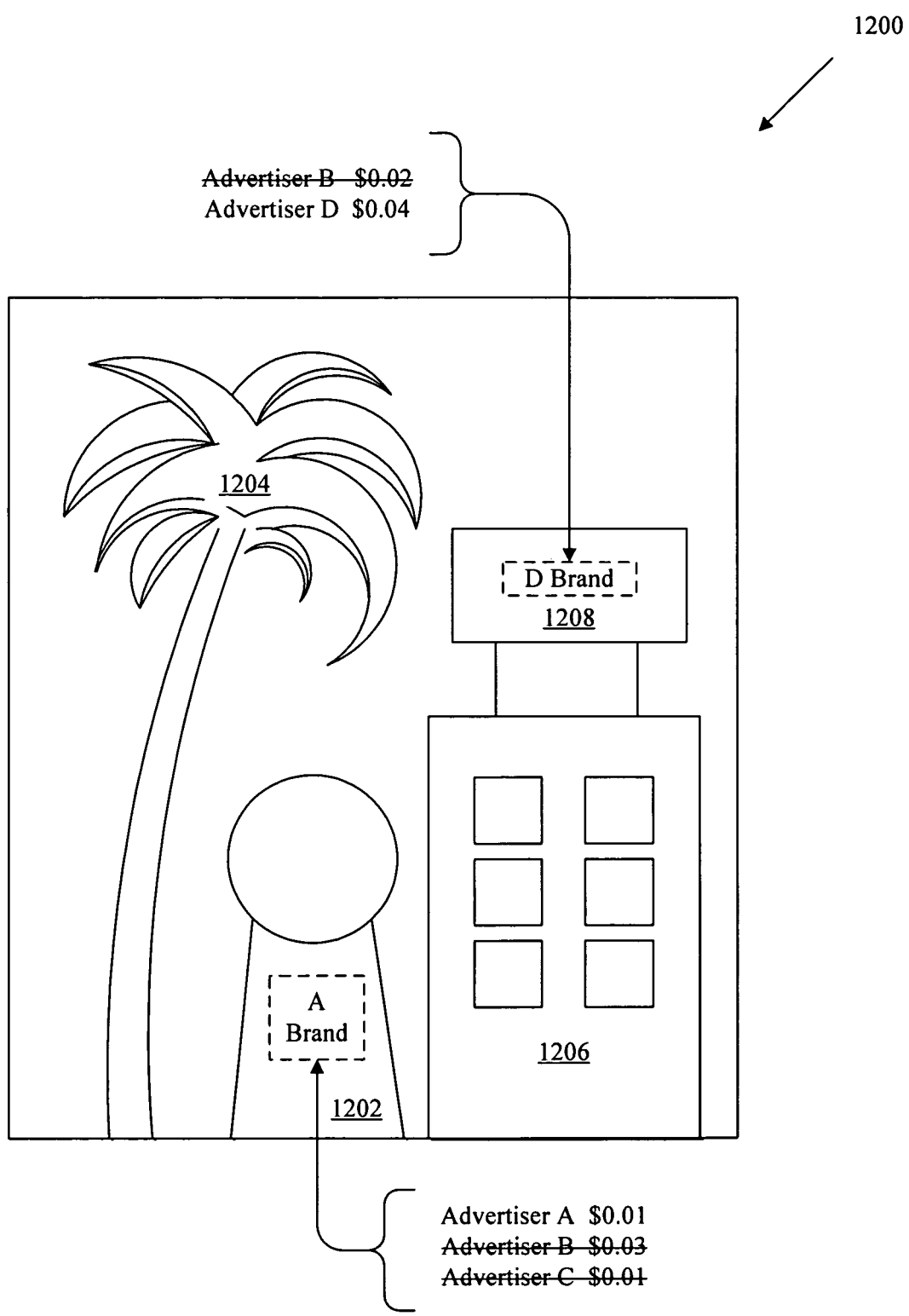
FIG. 12 illustrates the modified content of an embodiment.

FIG. 12 illustrates the insertion of an embodiment in further detail. As shown in this figure, the Advertiser A is chosen for the surface 1202 of the person's shirt. Additionally, the Advertiser D is selected for the billboard 1206. Conceptually, advertisements are selected for the advertisers "A" and "D" or based on one of the advertiser's campaigns designated herein by the exemplary brand labels "A" and "D". These advertisements for "Brand A" and "Brand D" are selected, placed, and/or presented by using the surfaces 1202 and 1206 in conjunction with the presentation of the content 1200. One of ordinary skill recognizes that, alternatively, a specific advertisement is selected directly without regard to the particular advertiser or campaign for each surface of the content 1200. Moreover, advertising is selectively placed and/or presented with any number of the surfaces of the content 1200. When a particular surface and particular advertisement are selected for presentation together, the surface and/or the advertisement may require additional editing, adaptation, and/or adjustment prior to presentation to a viewer or audience. For instance, for the billboard 1206, a selected advertisement may require re-sizing to fit the billboard surface 1206. For the person 1202, a selected advertisement may require motion adjustment for the movement of person between frames of video content, or for the duration that the person 1202 appears in the scene. One of ordinary skill appreciates further editing that may be required for both implicit and explicit advertising to appear within a variety of different types of content.

Figure 13:
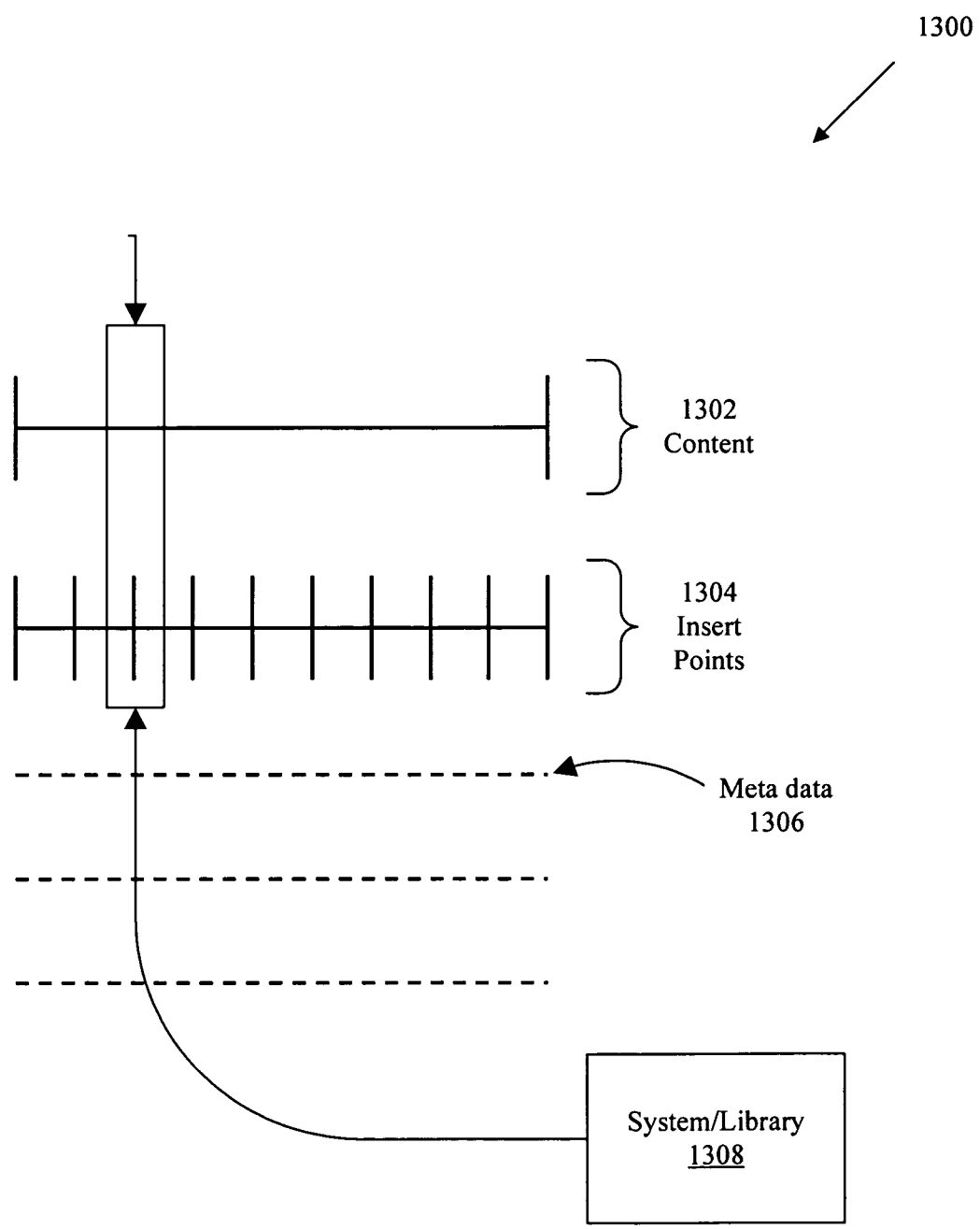
FIG. 13 illustrates an example of content adapted for modification.

FIG. 13 is a more specific illustration 1300 of the inclusion of advertising for presentation in conjunction with content 1302. In this figure, the content 1302 includes a video clip represented by a time line. The time line for the content 1302 has several insertion points 1304. In some embodiments, meta data 1306 associated with the content 1302 provide information regarding the insertion points 1304 as well as other information associated with the content 1302. Some embodiments use advertisements from an ad library 1308 and/or by using a system engine. Formation, maintenance, and access of the ad library 1308 in some embodiments are as described above in relation to FIGS. 3-10. Some embodiments operate in conjunction with particular applications. Such an application is further described in relation to FIG. 14.

Figure 14:
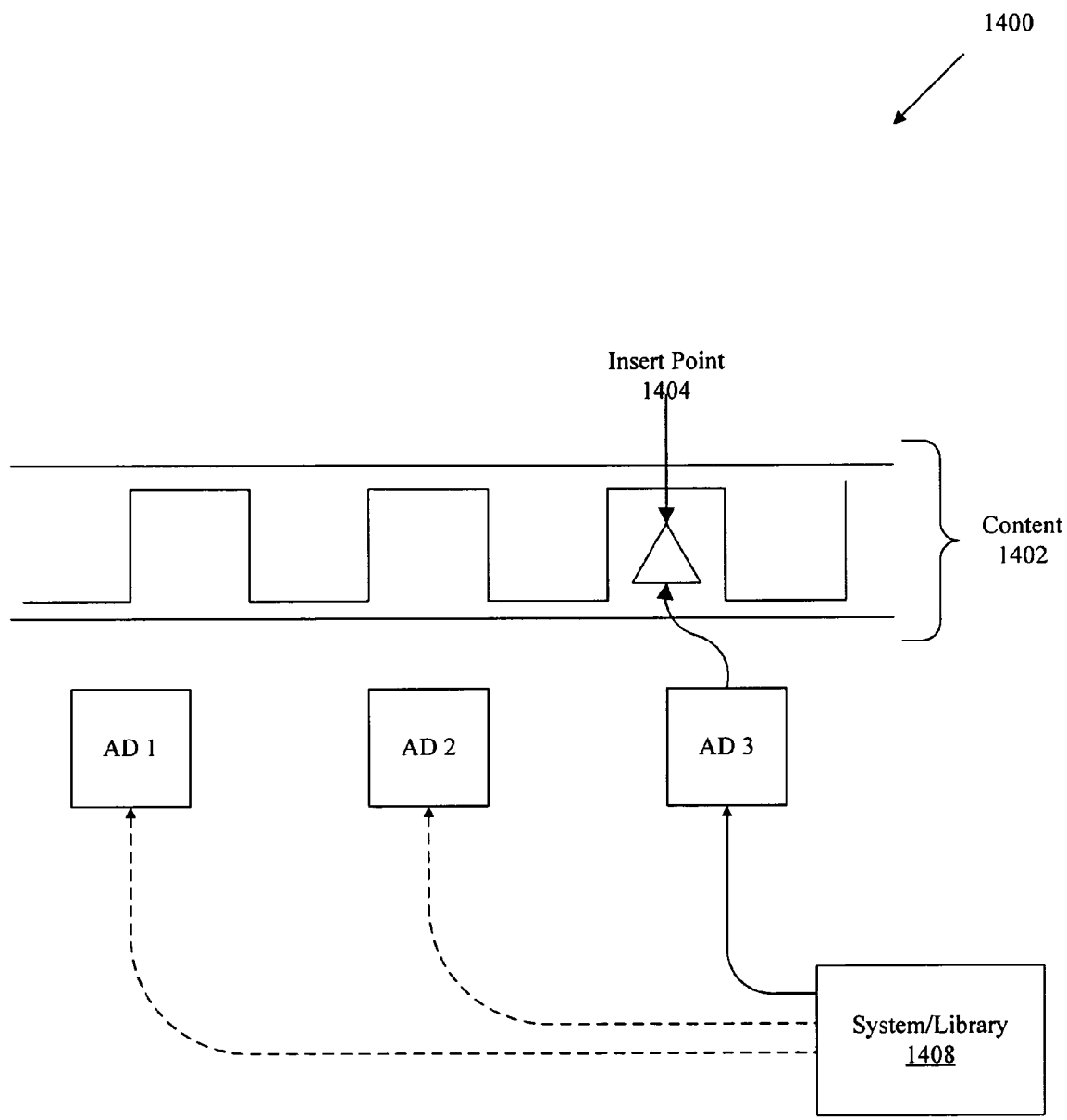
FIG. 14 illustrates adaptation of content.

FIG. 14 illustrates an embodiment 1400 that is used with a media editing application. As shown in this figure, the media content includes a user generated video clip 1402 that may be edited by a video editing application. The video editing application is provided by the system of some embodiments or includes another application known in the art such as, for example, iMovie™, FinalCut™, or another application. The content includes one or more insertion points 1404 that are marked by a marker that is identified by a user, or by the system of some embodiments. The marker(s) and/or insertion point(s) are preferably associated with the content by meta data or by another means. In the illustration 1400, the system or a user (producer or advertiser) selects from a collection of advertisements in an ad library 1408 for adaptation of the content 1402. Formation, maintenance, and access of the ad library 1408 in some embodiments are as described above in relation to FIGS. 3-10.

Three prospective advertisements Ad1, Ad2, and Ad3 are illustrated in the FIG. 14. The exemplary advertisements Ad1, Ad2, and Ad3 are representative of a variety of different advertising formats such as, for example, video, audio, text, image, banner, interstitial, and other types of advertisements. Once selected, the advertisement(s) and/or content often require adaptation prior to presentation to an audience of viewers. For instance, in one embodiment, the advertisement(s) are inserted and/or embedded into the content. For the video content 1402 of FIG. 14, the insertion of the advertisement may include an audio or video clip inserted into the media stream. When performed by a user in conjunction with a media editing application, the insertion is conveniently performed by using a drag and drop type operation. Once inserted and/or embedded, the advertisement and/or the content may require further adaptation such as for sizing, length, or another parameter or display characteristic. The foregoing often occurs in the case of both implicit and/or explicit advertising. For instance, for implicit advertising an inserted advertisement may require editing to appear more like the surrounding content such as the scene or frame(s) in which the advertisement appears. For explicit advertising, the advertisement may require resizing to fit proportionally within a frame, and image, or a feature within a frame.

The foregoing implementations involve a variety of different types of data, for instance, data for the content generator or the producer, and for the brand owner or advertiser. The particular subject matter of the content may include additional data. For the content 1000, the building 1006 and its owner may have data that is stored and used by the system engine of some embodiments. The person 1002 may also have data that is used by the system, by an advertiser, and/or by a producer. The data relating to the person 1002 appearing in the user generated content 1000 may be referred to as the talent data. Rights data is preferably handled by a rights engine. The rights engine of some embodiments is further described in the patent application incorporated by reference above.

Figure 18:
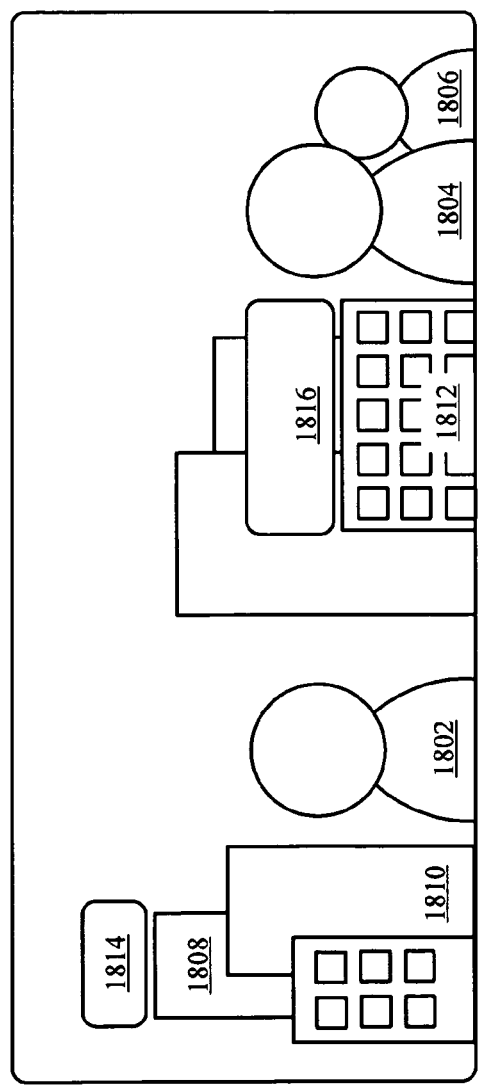
FIG. 18 illustrates a landscape view of a scene from the real world.

FIG. 18 illustrates a landscape view of a scene 1800 from the real world. As shown in this figure, the scene 1800 includes several objects that may have monetizable features such as, for example, surfaces, markers, and/or other features. More specifically, the scene 1800 includes people 1802, 1804, and 1806 in the foreground, and buildings 1808, 1810, and 1812 some of which having billboards 1814 and 1816, in the background. One of ordinary skill will recognize that these objects are merely representative, and that a scene from the real world may have any number of different objects in the field of view. It is further understood that these various exemplary objects have a variety of features such as surfaces that may be used for presentation of additional content, or content within content, such as advertising, for example. The people 1802, 1804, and 1806, of FIG. 18, for instance, have heads, faces, torsos, hats, clothing, and the like that have surfaces that are advantageously presented in conjunction with additional content such as advertisements. As described above, embodiments of the invention provide methods and systems for determining monetization options and/or presenting the monetization options to users who are interested in the monetization of content.

Figure 19:
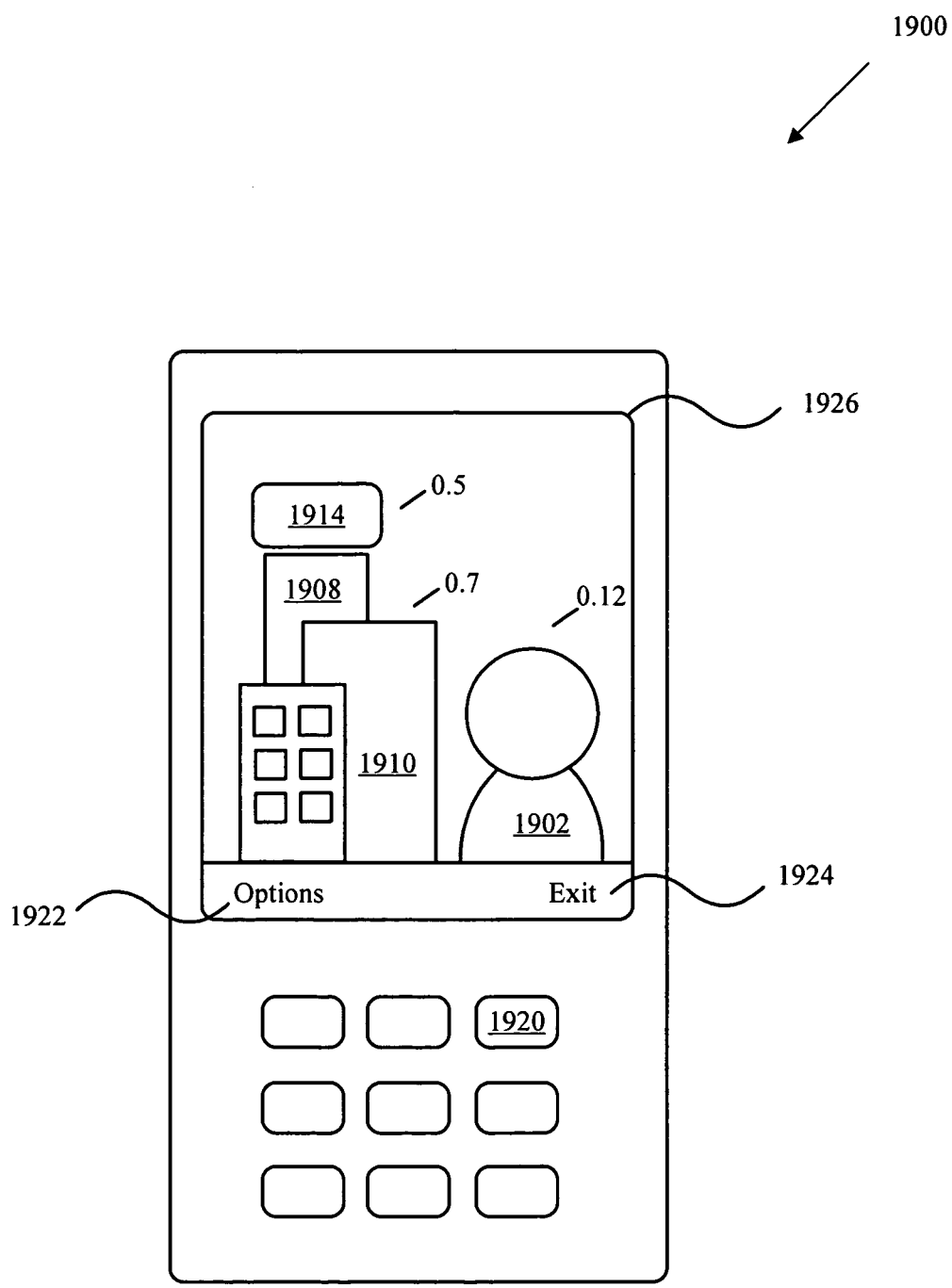
FIG. 19 illustrates a mobile device for capturing part of the view of FIG. 18.

Accordingly, FIG. 19 illustrates a mobile device 1900 for capturing part of the view of FIG. 18. As shown in FIG. 19, the mobile device 1900 includes user interface features such as buttons 1920, menu items 1922 and 1924, and a display 1926. The device 1900 may further include a mechanism for capturing content such as, for example, a camera that captures a still images or video frames. In these embodiments, when pointed at objects, the display 1926 preferably presents the objects and one or more monetization options of the objects to a user of the device 1900. Accordingly, as shown in the figure, the person 1902 may have a monetization of 0.12, the billboard 1914 may have a monetization of 0.5, and/or the building 1910 may have a monetization of 0.7. One of ordinary skill recognizes the monetizations of different embodiments. For instance, where the monetization involves a revenue sharing system, the revenue sharing preferably includes one or more of impressions, clicks, acquisitions, and/or another conversion type activity. Hence, a user who captures the person 1902 by using the device 1900, and who selects a monetization option for the person 1902 may select to share revenue for advertising by using the captured content including the image of the person 1902 at a rate of $0.12 cost per impression (CPI), for example, for presentation of advertising by using the person 1902, and/or in conjunction with the person 1902 of the captured content.

Figure 20:
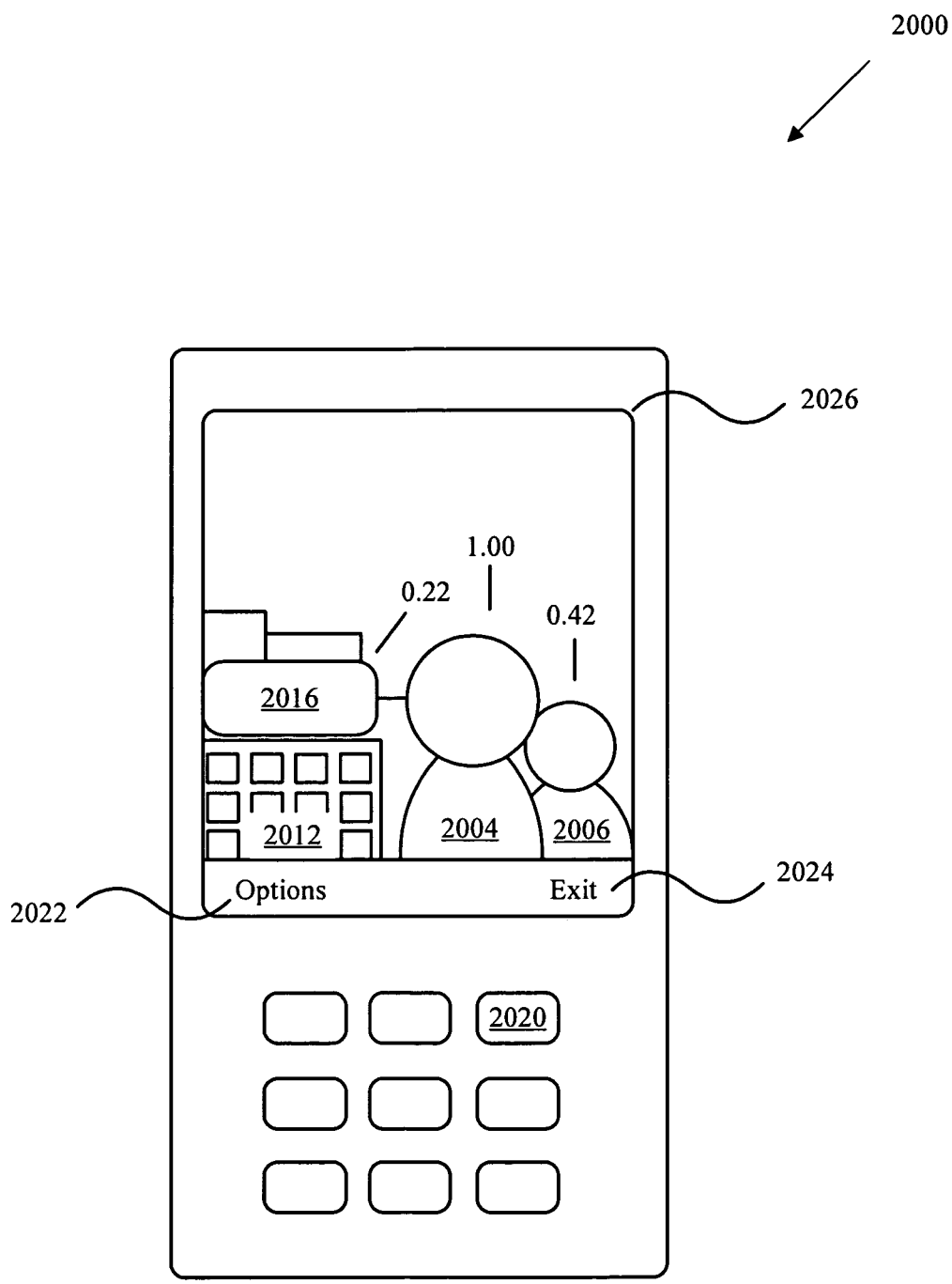
FIG. 20 illustrates a mobile device for capturing part of the view of FIG. 18.

FIG. 20 illustrates a mobile device 2000 for capturing part of the view of FIG. 18. For instance, when the device 2000 is pointed at a different portion of the scene 1800 of FIG. 18, a different set of monetization options is presented to the user through the display 2026. As shown in FIG. 20, the exemplary options include 1.00 for the person 2004, 0.42 for the person 2006, and/or 0.22 for the billboard 2016. As described above, these values advantageously represent indications to the user of revenue sharing characteristic for the various objects 2004, 2006, and/or 2016 that are presented within the display 2026 such as, for example, cost per impression (CPI), cost per click (CPC), cost per acquisition (CPA), and/or cost per another conversion activity or interaction. In this manner, some embodiments include a device that presents the earning potential of various content through monetization and/or advertising by using the content. Alternatively, the monetization indicators may instead represent the cost of using objects such as persons in a scene or view that have notoriety or costs associated with their use. Some of the embodiments described above, associate monetization of different real world entities or objects by using meta data.

FIG. 21 lists a variety of examples of meta data employed by embodiments of the invention. Different forms of spatial, temporal, and/or social meta data of the kinds listed in this figure are associated or attached to a variety of content objects in any phase of the content object's lifecycle such as, for example, production, consumption, sharing, and/or reuse. Moreover, some embodiments include standard content metadata such as, for example, file name, file size, and the like, in addition to the contextual (spatial/temporal), community (social), and consumption type meta data that are listed in the examples of FIG. 21.

As described above, some embodiments track the post production interaction with the monetized content and/or advertising. The tracking and/or monitoring is preferably performed regardless of the particular details of the monetization process and sequence. For example, a user (producer) generates a Hawaii vacation video sponsored by a sun block products advertiser or company such as Coppertone™. This corporate sponsor may solicit a user, first, to star in the vacation video for generation and sponsorship, and may even provide an enabled device as described above in relation to FIGS. 19 and 20. Alternatively, the sponsor may provide an online system or website for the submission of pre-generated user video where the majority of editing and/or monetization occur within the online system, and submitted content is reviewed and modified manually and/or by system automation. Regardless of these particular details, the generated video includes monetization such as advertising inserted and/or presented in conjunction with the content, and is uploaded to a location for consumption by the general public. During presentation to various users (consumers) of the video, a particular consumer of the video takes action with respect to the inserted advertisements and/or sponsorships. In particular embodiments, the user does not merely view the content and/or advertising as a static advertisement as in conventional broadcast television. Instead, the consumer preferably clicks to a website, views a location on a map, calls a phone number to speak to a marketer, receives an electronic or physical coupon, and/or interacts with the content or as a result of the content, in another manner.

IV. Targeting, Placement and Presentation Systems

Figure 15:
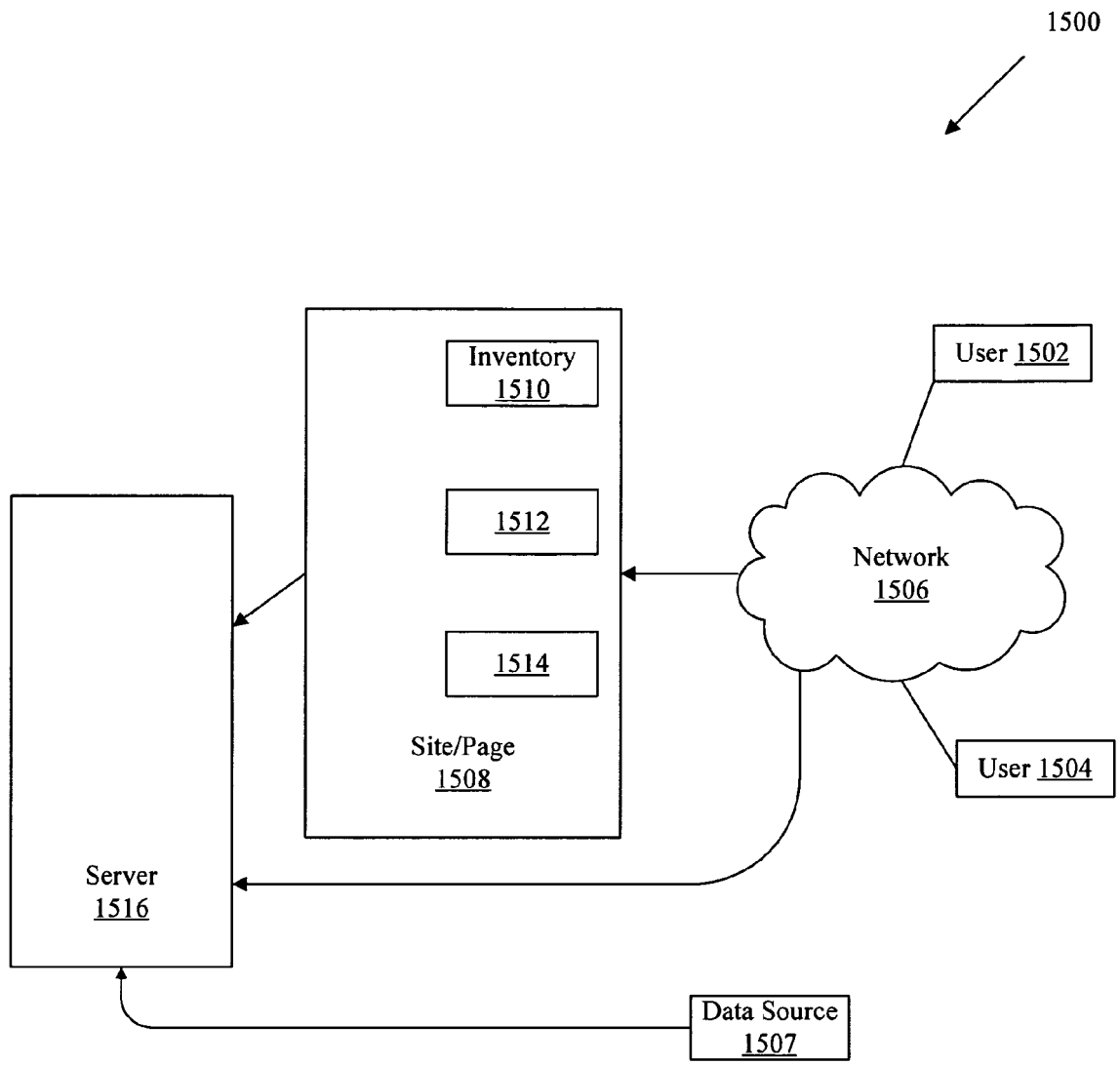
FIG. 15 illustrates targeting in accordance with some embodiments of the invention.

FIG. 15 illustrates a system 1500 that presents advertising to users through a network. As shown in this figure, the system 1500 includes a plurality of users 1502 and 1504 that interact with a network 1506. The network includes local area networks, wide area networks, and networks of networks such as the Internet, for example. The network 1506 typically includes several sites comprising a number of web pages having content and inventory. The ad inventory is for the presentation of advertising to the users 1502 and 1504. Accordingly, the network 1506 is coupled to an exemplary site or page 1508 that includes several inventory placements, surfaces, insertion points, and the like 1510, 1512 and 1514. The site 1508 may further include user generated content and is coupled to a server 1516 for data collection and processing. The server 1516 receives data from a variety of sources, including directly from the users 1502 and 1504, from the network 1506, from the site 1508, and/or from another source 1507. Typically, the site 1508 is provided by a publisher, while the server 1516 is typically provided by a portal operator, and/or an ad network. Further, as users 1502 and 1504 interact with the network 1506, and the site 1508, advertisements placed in the inventory of the site 1508, are presented to the users 1502 and 1504.

The selection and/or presentation of advertising through the inventory is a non trivial process. The inventory is typically distributed across many varied sites, zones, domains and pages. There are many different types of content, users, and types of users. Moreover, marketers, advertisements, and ad campaigns are usually numerous and varied as well. Timely, relevant, appropriate and/or coherent matching and delivery of content such as advertising is a problem that can have millions of input data points, or more.

Figure 16:
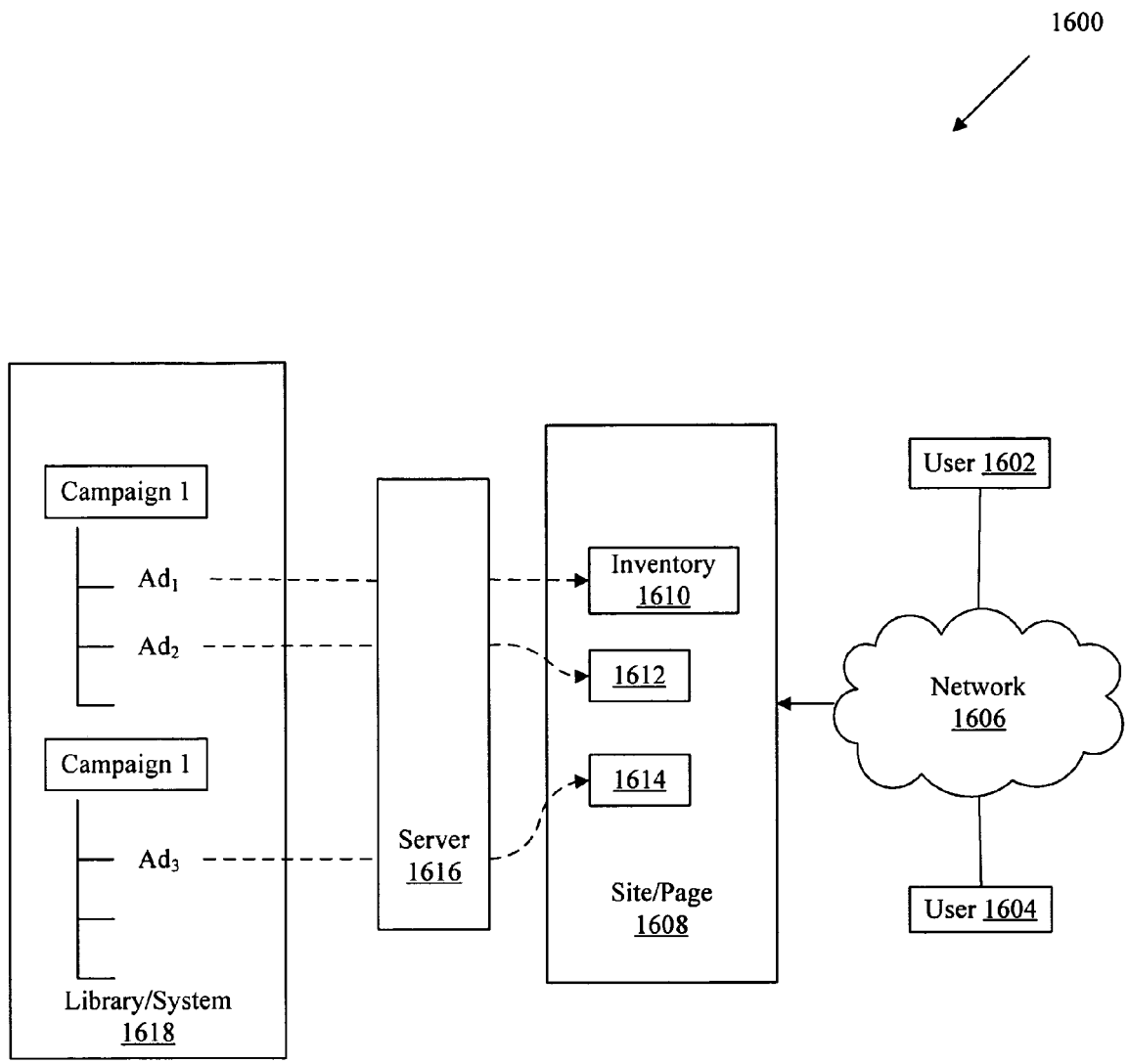
FIG. 16 illustrates a system for presenting advertising of some embodiments.

Hence, FIG. 16 illustrates a system 1600 for the intelligent selection of advertising for the site 1608, and the presentation of the selected advertisements to the users 1602 and 1604 through a network 1606. As shown in this figure, the system 1600, includes a server 1616 coupled to the site 1608, and a user 1618 who provides information to the server 1616. The users are varied and include, for example, producers, viewers, publishers, advertisers and/or marketers. Advertisers and/or marketers, for instance, generally have one or more ad campaigns that have one or more advertisements that are provided to the system 1600. A campaign and advertisements within the campaign are designed to promote an activity toward conversion by the user such as, for example, to generate a user impression, to generate a click, a lead, and/or an acquisition. Accordingly, the server 1616, and alternatively users, select and/or place the advertisements from the various campaigns of the marketer 1618 with the inventory 1610, 1612, and 1614, of the site 1608. Preferably, the selection is based on a variety of data that is collected and/or received by the server 1616. The data includes user data, publisher data, and/or marketer data that is compiled, processed, and stored in certain advantageous ways such as by using the generated advertising network and/or systems described above.

Figure 17:
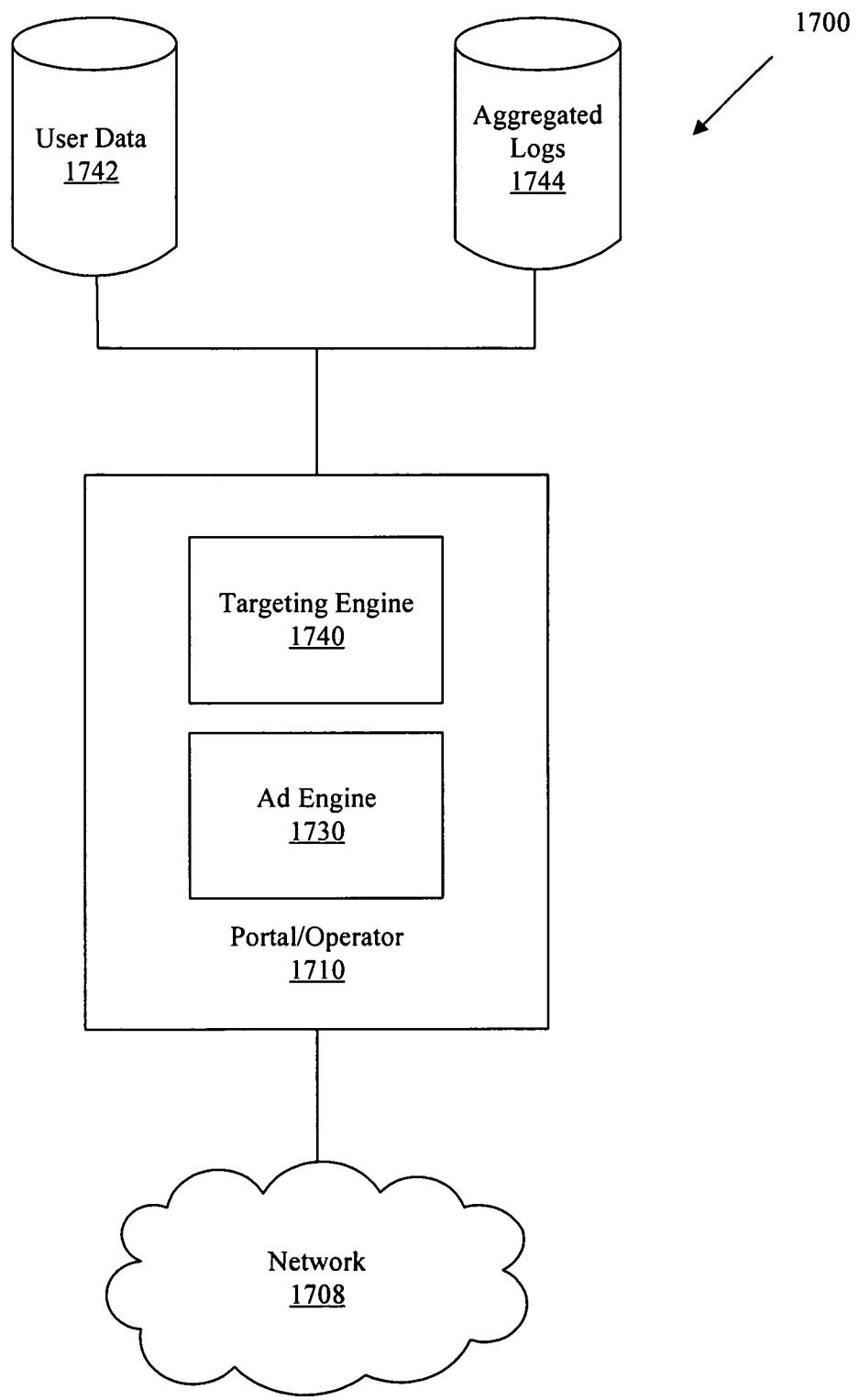
FIG. 17 illustrates a system for placing and presenting advertising according to some embodiments of the invention.

The data collection and processing of some embodiments further includes targeting such as behavioral targeting. Accordingly, FIG. 17 illustrates a system 1700 for processing and management of such information. As shown in the figure, the system 1700 includes a targeting engine 1740 that is coupled to a storage device 1742 for user information, and a storage device 1744 for log information such as aggregated activity logs, for example. Preferably, as users including viewers, producers, and advertisers interact with the system 1700 (e.g., interact with content and advertising), the system 1700 collects information regarding their activities by using the engine 1740 and the storage devices 1742 and 1744. Advantageously, the collected data is retrieved and processed for a variety of characteristics such as behavioral, affinity, and/or preference data of particular users, groups, demographic, and/or geographic data. The system 1700 of particular embodiments may further use these data for the selection, placement, and/or presentation of advertisements in conjunction with user generated content as described above.

While the invention has been described with reference to numerous specific details, one of ordinary skill in the art will recognize that the invention can be embodied in other specific forms without departing from the spirit of the invention. For instance, the examples given above often relate to online media. However, targeting across a multiple of media types is applicable as well. Thus, one of ordinary skill in the art would understand that the invention is not to be limited by the foregoing illustrative details, but rather is to be defined by the appended claims.

What is claimed is:

1. A computer implemented method comprising:

accessing, by a computer, a library, wherein the library comprises a plurality of content items, a plurality of advertisements, and an organizational structure for facilitating storage and retrieval of the content items and the advertisements;

identifying, by the computer, from among the plurality of content items within the library, a first content item comprising an image;

identifying a plurality of monetizable features for the first content item, wherein each monetizable feature comprises:

a surface area within the first content item, the surface area identified using an image recognition technique, the surface area is for use in overlaying an advertisement onto the surface area within the first content item, wherein the surface area meets a minimum threshold of appropriateness factors to display the advertisement;

displaying a plurality of monetization options for each of at least one of the surface areas of the monetizable features identified for the first content item, the plurality of monetization options for a monetizable feature's surface area identifying options for selecting from advertisements of the plurality of advertisements available for overlaying onto the monetizable feature's surface area within the first content item, the monetization options for each of the at least one of the surface areas comprises a plurality of options representing at least one different available advertisement;

selecting, by the computer, at least one advertisement by selecting from among the displayed monetization options;

formatting, by the computer, the selected advertisement for placement within the surface area; and generating, by the computer, a composite content item comprising the first content item and the selected advertisement wherein the selected advertisement is associated with the first content item using the monetizable feature of the first content item.

2. The computer implemented method of claim 1, the method further comprising:

presenting the selected advertisement in conjunction with the first content item; and tracking user interactions for the presentation of the selected advertisement.

3. The computer implemented method of claim 1, the method further comprising:

receiving at least one of the first content item and selected advertisement, thereby generating a received content item; and storing the received content item within the organizational structure of the library.

4. The computer implemented method of claim 1, the method further comprising:

calculating a revenue sharing value for the first monetizable feature of the first content item; and presenting the revenue sharing value to the user.

5. The computer implemented method of claim 1, wherein a second content item has a cost associated with presentation of the second content item, the method further comprising:

determining the cost of using the second content item;

selectively presenting the cost to a user of the system;

charging the user for the use of the second content item; and distributing the revenue from the use to an owner of the second content item.

6. The computer implemented method of claim 1, wherein the first content item comprises user generated content and the selected advertisement comprises one or more of a static advertisement, a dynamic advertisement, an implicit advertisement, and an explicit advertisement.

7. The computer implemented method of claim 1, the method further comprising:

identifying insertion points for the marker; and placing the marker with one or more insertion points, wherein the placing is optionally by user request or by system automation.

8. The computer implemented method of claim 1, the method further comprising setting a plurality of insertion points, including dynamic run-time markers for on-the-fly advertising insertion at a time of presentation of content.

9. The computer implemented method of claim 1, the method further comprising generating an interface for interacting with the library, the interactions with the library comprising operations to edit, search, sort, and combine content and advertisements stored within the library with selected content and advertisements, the interface comprising a graphical user interface having drag and drop functionality for the placement of one or more of the selected advertisement, a marker, and an insertion point, in relation to the first content item.

10. The computer implemented method of claim 1, wherein said identifying is executed in response to a command received from a user and wherein the user comprises one or more of an advertiser, an operator, a publisher, an owner of content, a producer, a consumer of content, and a user who shares, distributes, or uploads content, the system further comprising one or more features of a self serve application and an automated system for selecting and associating the selected advertisement with the first content item, for users of the system.

11. The computer implemented method of claim 1, the method further comprising:

receiving an advertising campaign for an advertiser, and receiving an advertiser payment offer and associated ad copy for the presentation of the advertiser's content including advertisements in conjunction with specific content.

12. The computer implemented method of claim 1, the method further comprising selectively billing and paying users of the system for qualifying interactions with the composite content item.

13. The computer implemented method of claim 1, wherein the generating a composite content item comprising the first content item and the selected advertisement comprises embedding the selected advertisement within the first content item.

14. The computer implemented method of claim 1, the method further comprising generating a user interface for layering user generated content and ad copy.

15. The computer implemented method of claim 1, the method further comprising modifying an advertising copy or financial terms of use of content and advertising such that higher rated content items receive higher valuation.

16. The computer implemented method of claim 1, further comprising:

receiving from advertisers requests for user generated content (UGC) and for users of the system to search and select data from among the advertisers.

17. The computer implemented method of claim 1, wherein generating a composite content item comprising the first content item and the selected advertisement performed automatically based upon collaborative filtering of related past performances for best-match insertion.

18. The computer implemented method of claim 1, wherein generating a composite content item comprising the first content item and the selected advertisement is performed dynamically based upon user or advertiser generated variables resolved at display request time.

19. The computer implemented method of claim 1, the method further comprising presenting monetization options to a user of the system.

* * * * *